United States Patent
Ashizaki et al.

(10) Patent No.: US 7,386,491 B2
(45) Date of Patent: Jun. 10, 2008

(54) MERCHANDISE ORDER RECEIVING SYSTEM AND MERCHANDISE ORDER RECEIVING METHOD

(75) Inventors: Koji Ashizaki, Tokyo (JP); Akira Shirakura, Tokyo (JP); Shigeyuki Baba, Tokyo (JP); Kazumasa Sato, Tokyo (JP); Hirotaka Sugiyama, Tokyo (JP)

(73) Assignee: Sony Corporation (JP)

( * ) Notice: Subject to any disclaimer, the term of this patent is extended or adjusted under 35 U.S.C. 154(b) by 689 days.

(21) Appl. No.: 09/974,525

(22) Filed: Oct. 10, 2001

(65) Prior Publication Data

US 2002/0082951 A1 Jun. 27, 2002

(30) Foreign Application Priority Data

Oct. 16, 2000 (JP) ............................ P2000-315971

(51) Int. Cl.
*G06Q 30/00* (2006.01)

(52) U.S. Cl. .................................................... 705/27

(58) Field of Classification Search ................... 705/26, 705/27, 28, 29, 37
See application file for complete search history.

(56) References Cited

U.S. PATENT DOCUMENTS

| | | | | |
|---|---|---|---|---|
| 6,118,475 A * | 9/2000 | Iijima et al. | .................... | 348/42 |
| 6,444,072 B1 * | 9/2002 | Weder | ......................... | 156/209 |
| 6,466,205 B2 * | 10/2002 | Simpson et al. | ............. | 345/419 |
| 6,493,677 B1 * | 12/2002 | von Rosen et al. | ............. | 705/27 |
| 6,717,686 B1 * | 4/2004 | Farros et al. | .................. | 358/1.1 |
| 6,748,415 B1 * | 6/2004 | Sugimoto | .................... | 709/201 |
| 6,804,786 B1 * | 10/2004 | Chamley et al. | ............. | 713/201 |

* cited by examiner

*Primary Examiner*—Gerald J. O'Connor
(74) *Attorney, Agent, or Firm*—Lerner, David, Littenberg, Krumholz & Mentlik, LLP

(57) ABSTRACT

In a merchandise order receiving system, an order controlling server receives an order of a merchandise from a user terminal; a charging and settlement server performs the charging and the settlement of the merchandise; an order receiving server receives an order of the delivery of a merchandise; a print-out apparatus prints image data from an image storing server to generate printed material such a as hologram or holographic stereogram; and a merchandise assembling apparatus generates an assembled merchandise by incorporating the printed matter in the merchandise and supplies the assembled merchandise to a shipping terminal.

10 Claims, 16 Drawing Sheets

FIG.2

| ORDER NUMBER | PASSWORD | ORDER DATE | ORDERED MERCHANDISE | CLASSIFICATION OF MERCHANDISE | QUANTITY | ORDERED PRICE | CHARGING NUMBER | ADDRESSEE'S NAME | ADDRESSEE'S ADDRESS | CHARACTER& IMAGE DATA | PROCESSED IMAGE DATA | SHIPPING DATE |
|---|---|---|---|---|---|---|---|---|---|---|---|---|
| JPODR 001 | 468a ce02 | 2000/01/01 14:00:15 | COMPUTER | WHITE | 1 | 200000 YEN | JPPAY 797 | OOOO | OOOO, TOKYO | JPCHR 001 | JPIMG 001 | 2000/01/15 |
| JPODR 002 | 7953 1fdb | 2000/01/01 14:10:40 | DIGITAL STILL CAMERA | SILVER | 4 | 400000 YEN | JPPAY 798 | ××× | ××××, TOKYO | JPGRH 002 | JPIMG 002 | 2000/01/13 |
| JPODR 004 | 9462 8462 | 2000/01/03 21:00:15 | POCKET-BOOK | BLACK | 10 | 200000 YEN | JPPAY 800 | △△△△ | △△△△, TOKYO | JPCHR 003 | JPIMG 004 | 2000/01/10 |
| JPODR 005 | 372B 6742 | 2000/01/15 08:40:15 | CELLULAR PHONE | RED | 1 | 100000 YEN | JPPAY 801 | □□□□ | □□□□, TOKYO | JPGRH 004 | JPIMG 005 | 2000/01/30 |

FIG.3

| PROCESSED IMAGE DATA | REGISTRATION DATE (ORDERED DATE) | IMAGE DATA |
|---|---|---|
| JPIMG001 | 1999/12/30 23:00:20 | (IMAGE DATA) |
| JPIMG002 | 1999/12/31 05:37:05 | (IMAGE DATA) |
| JPIMG004 | 1999/12/31 10:35:00 | (IMAGE DATA) |
| JPIMG005 | 1999/12/31 16:50:55 | (IMAGE DATA) |
| JPIMG007 | 2000/01/01 14:00:15 | (IMAGE DATA) |
| JPIMG008 | 2000/01/01 14:10:40 | (IMAGE DATA) |

FIG.4

| CHARGING NUMBER | CHARGING DATE | CHARGED AMOUNT (ORDERED PRICE) | PAYMENT METHOD | NAME OF FINANCIAL INSTITUTION | CARD NUMBER & ACCOUNT NUMBER | SETTLEMENT STATUS |
|---|---|---|---|---|---|---|
| JPPAY 800 | 2000/01/03 21:00:15 | 20000 YEN | CREDIT CARD | +++++ CREDIT CO. | 7890-1234 | PENDING |
| JPPAY 801 | 2000/01/15 08:40:15 | 10000 YEN | BANK ACCOUNT | **** BANK CO. | 653-56789 | RECEIVED |

FIG.5

| ORDER NUMBER | PASSWORD | ORDER DATE | ORDERED MERCHANDISE | CLASSIFICATION OF MERCHANDISE | QUANTITY OF MERCHANDISE | ADDRESSEE'S NAME | ADDRESSEE'S ADDRESS | CHARACTERS & IMAGE DATA | PROCESSED IMAGE DATA |
|---|---|---|---|---|---|---|---|---|---|
| JPODR 001 | 468a ce02 | 2000/01/01 14:00:15 | COMPUTER | WHITE | 1 | ○○○○ | ○○○○, TOKYO | (CHARACTER DATA) | JPIMG 001 |
| JPODR 002 | 7953 1fdb | 2000/01/01 14:10:40 | DIGITAL STILL CAMERA | SILVER | 4 | ×××× | ××××, TOKYO | (IMAGE DATA) | JPIMG 002 |
| JPODR 004 | 9462 8462 | 2000/01/03 21:00:15 | POCKET-BOOK | BLACK | 10 | △△△△ | △△△△ TOKYO | (CHARACTER DATA) | JPIMG 004 |
| JPODR 005 | 372B 6742 | 2000/01/15 08:40:15 | CELLULAR PHONE | RED | 1 | □□□□ | □□□□, TOKYO | (IMAGE DATA) | JPIMG 005 |

FIG.13

| ORDER NUMBER | PASSWORD | ORDER DATE | ORDERED MERCHANDISE | CLASSIFICATION OF MERCHANDISE | QUANTITY | ORDERED PRICE | CHARGING NUMBER | ADDRESSEE'S NAME | ADDRESSEE'S ADDRESS | CHARACTER& IMAGE DATA | PROCESSED IMAGE DATA | SHIPPING DATE | PRINTED MATTER SHIPPING DATE |
|---|---|---|---|---|---|---|---|---|---|---|---|---|---|
| JPODR 001 | 468a ce02 | 2000/01/01 14:00:15 | COMPUTER | WHITE | 1 | 200000 YEN | JPPAY 797 | ○○○○ | ○○○○, TOKYO | JPCHR 001 | JPIMG 001 | 2000/ 01/15 | 2000/ 01/20 |
| JPODR 002 | 7953 1fdb | 2000/01/01 14:10:40 | DIGITAL STILL CAMERA | SILVER | 4 | 400000 YEN | JPPAY 798 | ××××  | ××××, TOKYO | JPCHR 002 | JPIMG 002 | 2000/ 01/13 | 2000/ 01/15 |
| JPODR 004 | 9462 8462 | 2000/01/03 21:00:15 | POCKET- BOOK | BLACK | 10 | 20000 YEN | JPPAY 800 | △△△△ | △△△△ TOKYO | JPCHR 003 | JPIMG 004 | 2000/ 01/10 | 2000/ 01/20 |
| JPODR 005 | 372B 6742 | 2000/01/15 08:40:15 | CELLULAR PHONE | RED | 1 | 10000 YEN | JPPAY 801 | □□□□ | □□□□ TOKYO | JPCHR 004 | JPIMG 005 | 2000/ 01/30 | 2000/ 02/02 |

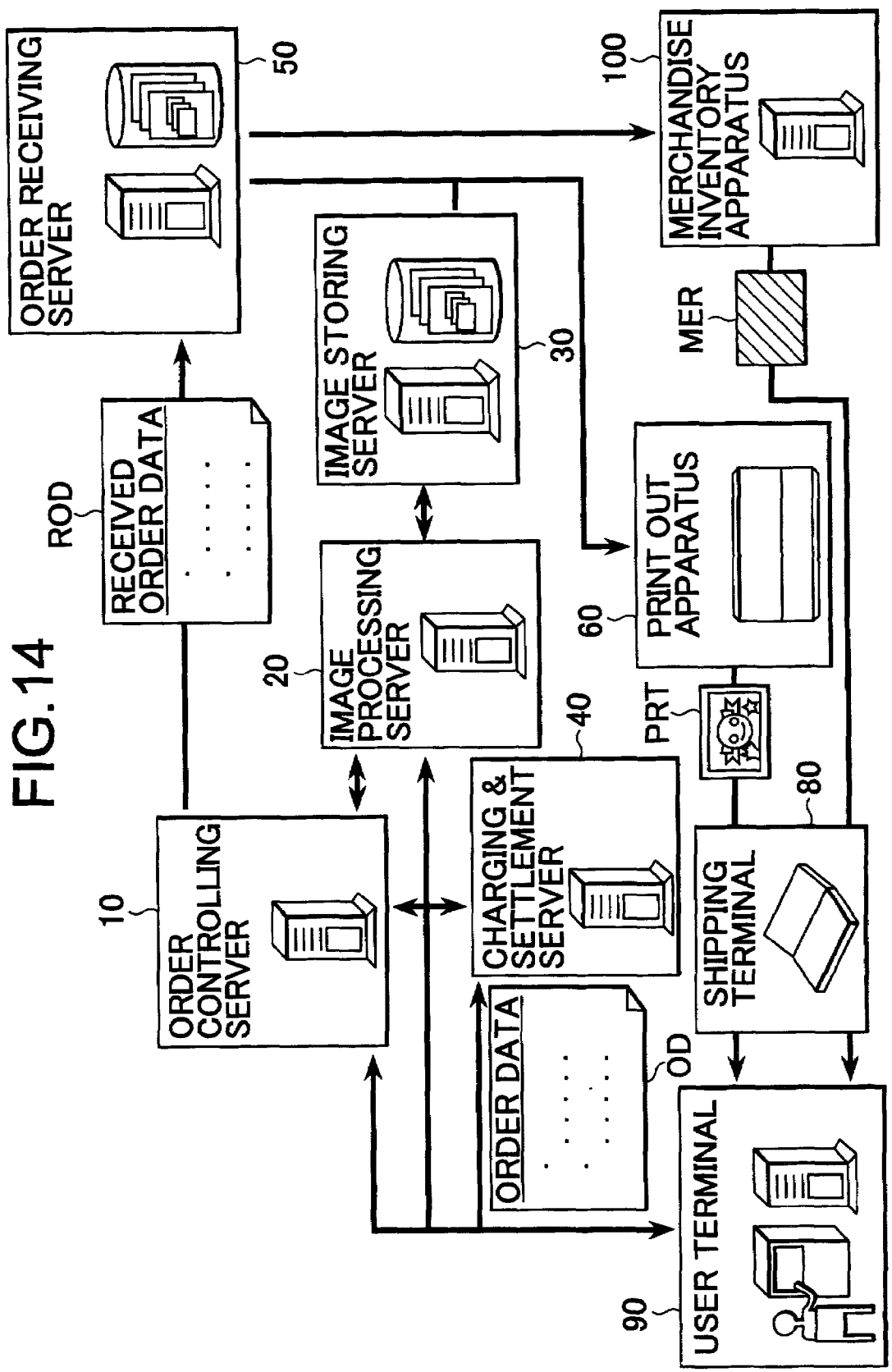

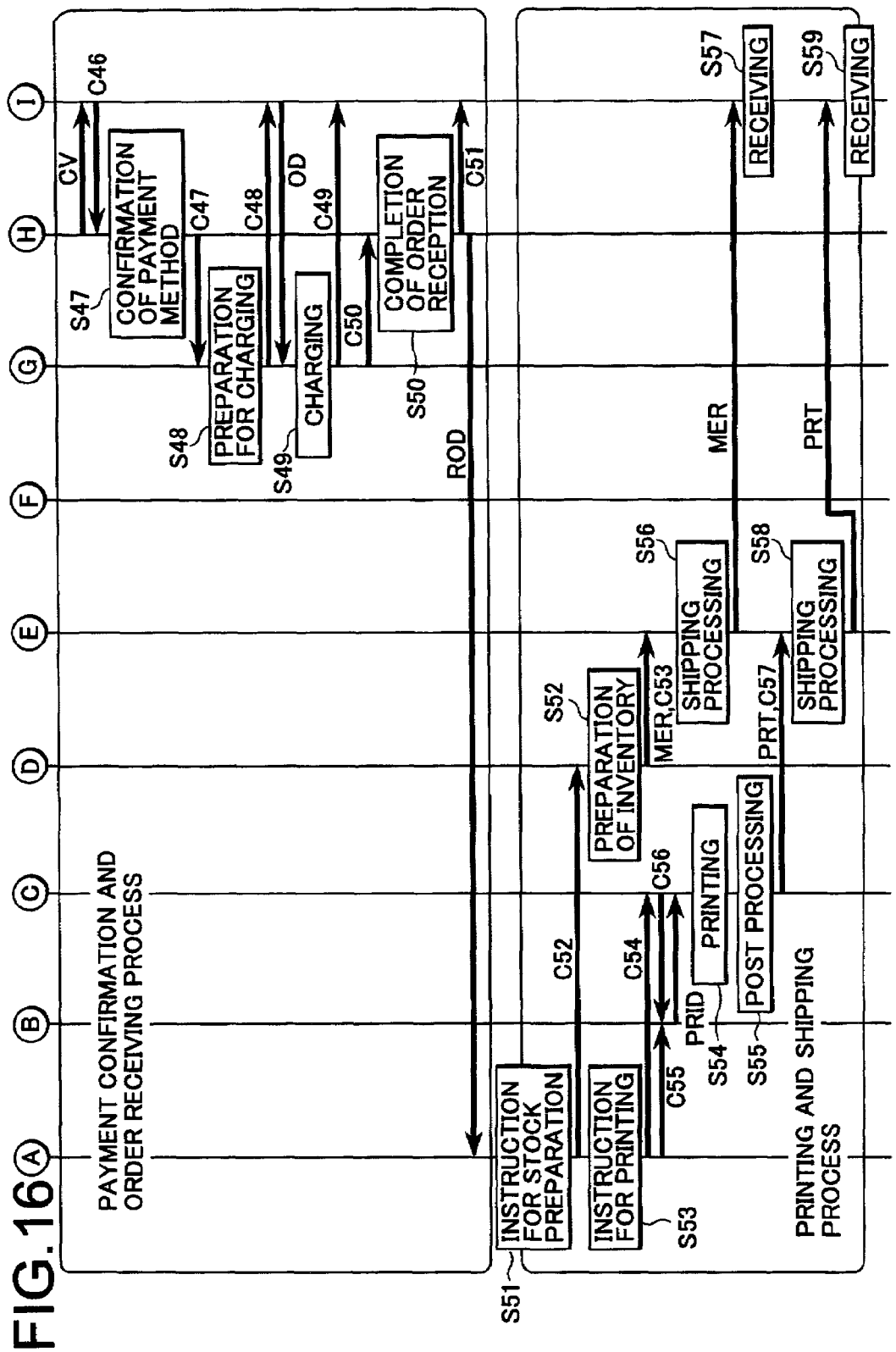

MERCHANDISE ORDER RECEIVING SYSTEM AND MERCHANDISE ORDER RECEIVING METHOD

CROSS REFERENCE TO RELATED APPLICATIONS

The present application claims priority to Japanese Patent Application No. JP 2000-315971, filed on Oct. 16, 2000, the disclosure thereof being herein incorporated by reference to the extent permitted by law.

BACKGROUND OF THE INVENTION

1. Field of the Invention

The present invention relates to a merchandise order receiving system, i.e., a system for receiving an order for merchandise, a product, goods, commodities or the like, and a merchandise order receiving method, both for receiving order for merchandise/goods/commodities through network.

2. Description of the Related Art

Recently, systems for selling merchandise through a network such as the Internet have been established. In such systems, a customer accesses so-called a Website managed by an business operator by the use of a communication terminal to select a desired merchandise and input prescribed information to perform a process of receiving an order of the merchandise. In such a system, it is not necessary for a customer/client to actually visit a store in person in order to purchase the merchandise. Accordingly, the customer can spend more time to select merchandise among a variety of choices.

SUMMARY OF THE INVENTION

In recent years, the following trend can be seen. That is, merchandise small in quantity but various in kinds or merchandise corresponding to individual tastes such as a custom-made merchandise are preferred rather than mass-produced similar merchandise. Moreover, a trend of popular demand for merchandise having added values is becoming conspicuous.

However, the system has also a demerit such that a customer is obliged to select a desired merchandise only among the merchandise that have been prepared in advance although the aforesaid system or a system for selling merchandise through networks has a merit such that a customer is not necessary to visit a store and the like. Accordingly, it is difficult for the business operator to provide merchandise particularly suit for personal demand of a customer.

From such reasons, a customer utilizing the system may feels an inconvenience. That has been a factor detracting the convenience as the system.

The present invention addresses the above-cited problems. It is desired to provide a merchandise order receiving system and a merchandise order receiving method, both of the system and the method enabling a customer to order a merchandise peculiar to the customer and enabling an business operator to supply a merchandise with a highly added values, both of the system and the method thereby being able to supply superior convenience to both of the customer and the business operator.

A merchandise order receiving system wherein a plurality of communication terminals order merchandise through a network according to an embodiment of the present invention includes: an order reception apparatus connected with the plural communication terminals through the network, the order reception apparatus receiving an order of the merchandise demanded by each of the plural communication terminals; an image storing apparatus connected with the order reception apparatus through another network different from the aforesaid network, the image storing apparatus storing character information and/or image information as image data; a charging and settlement apparatus connected with the plural communication terminal through the network, the charging and settlement apparatus performing charging and settlement of the ordered merchandise; an order receiving apparatus connected with the order reception apparatus through the another network, the order receiving apparatus receiving an order of delivery of the merchandise through the another network, the delivery being ordered to the order reception apparatus by the communication terminals through the network, according to the charging and settlement performed by the charging and settlement apparatus; a print out apparatus connected with the order reception apparatus through the another network, the print out apparatus printing the image data supplied from the image storing apparatus through the another network in form of a hologram or holographic stereogram as printed matter; a merchandise assembling apparatus connected with the order reception apparatus through the another network, the merchandise assembling apparatus incorporating the printed matter in the merchandise to assemble an assembled merchandise as final shipping goods; and a shipping terminal connected with the order reception apparatus through the another network, the shipping terminal performing shipping processing of the assembled merchandise assembled by the merchandise assembling apparatus, wherein: the plural communication terminals severally designate a desired character and/or a desired image at a time of an order of the merchandise, and the image data corresponding to the character and/or the image, both being designated by each of the plural communication terminals, are supplied to the print out apparatus from the image storing apparatus through the another network, and the print out apparatus prints the supplied image data to output the printed matter.

This merchandise order receiving system according to an embodiment of the present invention designate a desired character and/or a desired image with a communication terminal at the time of an order of a merchandise, and incorporates printed matter such as a hologram or holographic stereogram using the designated character and/or the designated image into the merchandise to deliver it.

Moreover, a method for receiving an order for merchandise according to another embodiment of the present invention is the method comprising the steps of: accepting an order of a merchandise from one of a plurality of communication terminals through a network, and a designation of a desired character and/or a desired image; receiving an order of the merchandise demanded by each of the plural communication terminals with an order reception apparatus connected with the plural communication terminals through the network; performing charging and settlement of the ordered merchandise with a charging and settlement apparatus connected with the plural communication terminals through the network; receiving an order of delivery of the merchandise ordered by the communication terminals to the order reception apparatus through the network with an order receiving apparatus, connected with the order reception apparatus through another network different from the network, according to the charging and the settlement performed by the charging and settlement apparatus; supplying image data, which correspond to the character and/or the image designated by each of the plural communication terminals in character information and/or image information stored as image data in an image storing apparatus connected with the order reception apparatus through the another network, to a print out apparatus connected with the order reception apparatus through the another network, and printing the image data in form of a hologram or holographic stereogram as printed matter with the print out apparatus; incorporating the printed matter in the merchandise to assemble an assembled merchandise as final shipping goods by a merchandise assembling apparatus connected with the order reception apparatus through the another network; and performing shipping processing of the assembled merchandise assembled by the merchandise assembling apparatus with a shipping terminal connected with the order reception apparatus through the another network.

This merchandise order receiving method according to an embodiment of the present invention designates a desired character and/or a desired image with a communication terminal at the time of an order of a merchandise, and incorporates printed matter such as a hologram or holographic stereogram using the designated character and/or the designated image into the merchandise to deliver it.

Furthermore, a merchandise order receiving system wherein a plurality of communication terminals order a merchandise through a network according to a further embodiment of the invention includes: an order reception apparatus connected with the plural communication terminals through the network, the order reception apparatus receiving an order of the merchandise demanded by each of the plural communication terminals; an image storing apparatus connected with the order reception apparatus through another network different from the aforesaid network, the image storing apparatus storing character information and/or image information as image data; a charging and settlement apparatus connected with the plural communication terminal through the network, the charging and settlement apparatus performing charging and settlement of the ordered merchandise; an order receiving apparatus connected with the order reception apparatus through the another network, the order receiving apparatus receiving an order of delivery of the merchandise through the another network, the delivery being ordered to the order reception apparatus by the communication terminals through the network, according to the charging and settlement performed by the charging and settlement apparatus; a print out apparatus connected with the order reception apparatus through the another network, the print out apparatus printing the image data supplied from the image storing apparatus through the another network in a form of a hologram or holographic stereogram as printed matter; a merchandise inventory apparatus connected with the order reception apparatus through the another network, the merchandise inventory apparatus performing inventory control of the merchandise to prepare the merchandise as final shipping goods; and a shipping terminal connected with the order reception apparatus through the another network, the shipping terminal performing shipping processing for shipping the merchandise prepared by the merchandise inventory apparatus and the printed matter printed by the print out apparatus together with each other or separately from each other, wherein: the plural communication terminals respectively designate a desired character and/or a desired image at a time of an order of the merchandise, and the image data corresponding to the character and/or the image, both being designated by each of the plural communication terminals, are supplied to the print out apparatus from the image storing apparatus through the another network, and the print out apparatus prints the supplied image data to output the printed matter.

This merchandise order receiving system according to an embodiment of the present invention designates a desired character and/or a desired image with a communication terminal at the time of an order of a merchandise, and forwards the merchandise and printed matter including a hologram or holographic stereogram using the designated character and/or the designated image together with or separately from the merchandise.

Furthermore, a method for receiving an order for merchandise according to a still further embodiment of the invention is the method comprising the steps of: accepting an order of a merchandise from one of a plurality of communication terminals through a network and a designation of a desired character and/or a desired image; receiving an order of the merchandise demanded by each of the plural communication terminals with an order reception apparatus connected with the plural communication terminals through the network; performing charging and settlement of the ordered merchandise with a charging and settlement apparatus connected with the plural communication terminals through the network; receiving an order of delivery of the merchandise ordered by the communication terminals to the order reception apparatus through the network with an order receiving apparatus, connected with the order reception apparatus through another network different from the network, according to the charging and the settlement performed by the charging and settlement apparatus; supplying image data, which correspond to the character and/or the image designated by each of the plural communication terminals in character information and/or image information stored as image data in an image storing apparatus connected with the order reception apparatus through the another network, to a print out apparatus connected with the order reception apparatus through the another network, and printing the image data in form of a hologram or holographic stereogram as printed matter with the print out apparatus; preparing the merchandise as final shipping goods in merchandise under inventory control by a merchandise inventory apparatus connected with the order reception apparatus through the another network; and performing shipping processing for shipping the merchandise prepared by the merchandise inventory apparatus and the printed matter printed by the print out apparatus together with each other or separately from each other with a shipping terminal connected with the order reception apparatus through the another network.

This merchandise order receiving system according to an embodiment of the present invention designates a desired character and/or a desired image with a communication terminal at the time of an order of a merchandise, and forwards the merchandise and printed matter such as a hologram or holographic stereogram using the designated character and/or the designated image together with or separately from the merchandise.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 2 is a diagram for illustrating various kinds of information concerning the reception of an order to be stored in an order database included in an order controlling server equipped in the merchandise order receiving system;

FIG. 3 is a diagram for illustrating various kinds of information concerning image data to be stored in an image database included in an image storing server equipped in the merchandise order receiving system;

FIG. 4 is a diagram for illustrating various kinds of information concerning charging and settlement to be stored in a charging database equipped in a charging & settlement server of the merchandise order receiving system;

FIG. 5 is a diagram for illustrating various kinds of information concerning the receiving of an order to be stored in a receiving database section included in a receiving server equipped in the merchandise order receiving system;

FIG. 13 is a diagram for illustrating various kinds of information concerning the reception of orders to be stored in an order database included in an order controlling server equipped in a merchandise order receiving system as a third embodiment of the present invention;

FIG. 14 is a diagram for illustrating information delivered between each apparatus in the merchandise order receiving system;

FIG. 16 is a diagram for illustrating a series of the processing processes in the merchandise order receiving system, illustrating payment confirmation & order receiving processes and printing & shipping process.

DESCRIPTION OF THE PREFERRED EMBODIMENTS

Hereinafter, detailed embodiments, to which the present invention is applied, are described in detail by reference to the attached drawings.

The embodiments concern a merchandise order receiving system through network. In the system, a customer designates a desired character and/or a desired image when the customer orders merchandise (a product, goods, commodities or the like) or a printed matter including a hologram using the designated character and/or the designated image is incorporated in the merchandise to be delivered. Or, the printed matter of the hologram using the designated character and/or the designated image, and the merchandise is delivered together or separately. It has to be noted that "hologram" here includes a hologram, a holographic stereogram or the like. Also, "printed matter" of a hologram may include prints or copies obtained by exposure, press forming, copying, hard copying processing or the like.

At first, descriptions are given for a merchandise order receiving system in which a printed matter including a hologram using a designated character and/or a designated image is incorporated in a merchandise to be delivered as a first embodiment of the invention.

Figure 1:
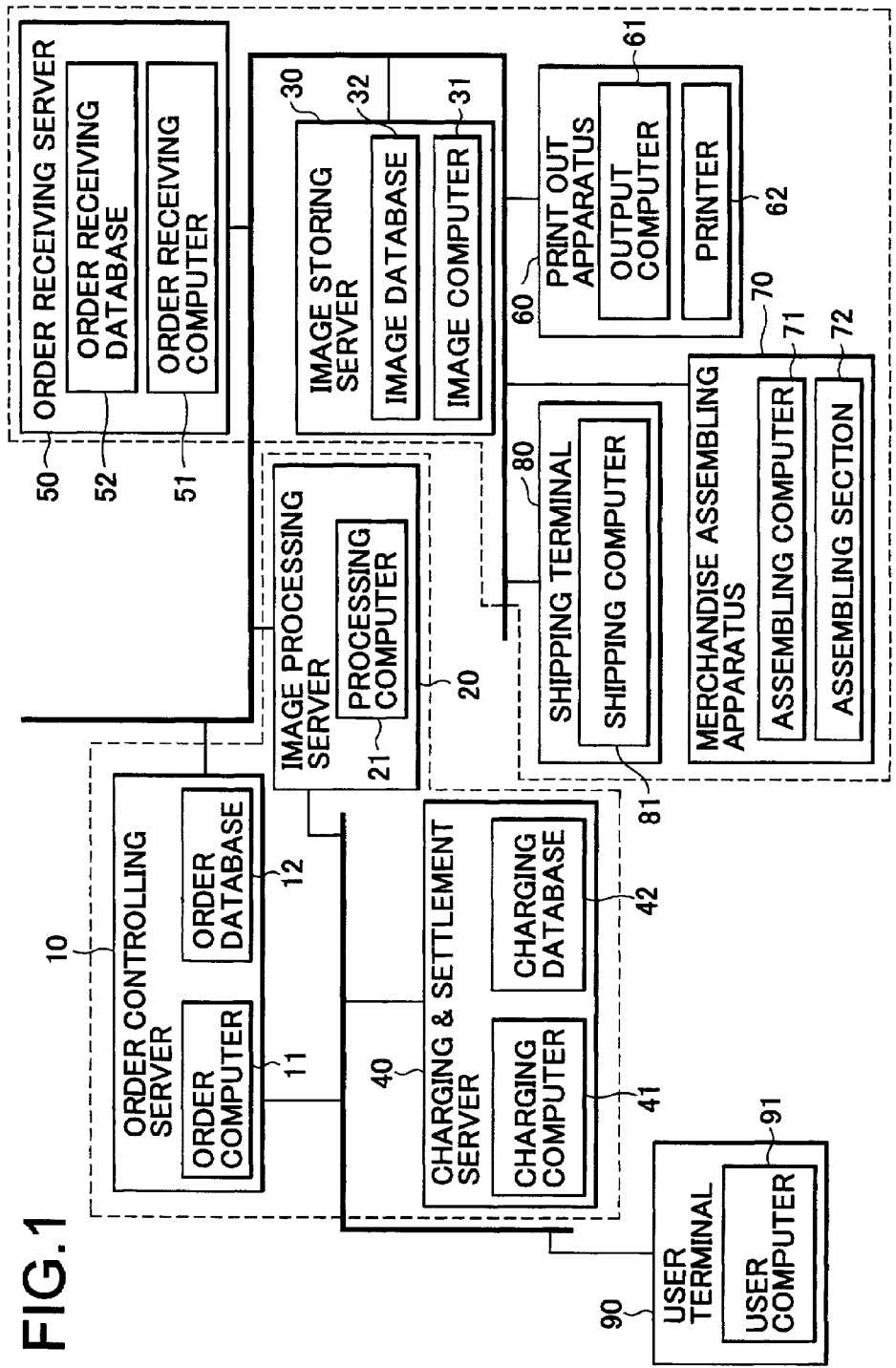
FIG. 1 is a block diagram showing the configuration of a merchandise order receiving system as a first embodiment of the present invention.

The merchandise order receiving system, as shown in FIG. 1, includes an order controlling server for receiving order for merchandise 10, an image processing server 20 for performing various kinds of processing for an image, an image storing server 30 for storing images, a charging & settlement server 40 for performing the charging and settlement of an ordered merchandise, an order receiving server 50 for receiving shipping of a merchandise, a print out apparatus 60 for printing an image to output the printed matter, a merchandise assembling apparatus 70 for assembling merchandise as final shipping product, a shipping terminal 80 for performing the processing of shipping the merchandise, and a user terminal 90 owned by a user that can be recognized as a customer.

Among these apparatuses, the image storing server 30, the order receiving server 50, the print out apparatus 60, the merchandise assembling apparatus 70 and the shipping terminal 80 constitutes what could be called a backyard, and the order controlling server 10, the image processing server 20 and the charging & settlement server 40 constitute a server group constituting what can be called storefront corresponding to a user. In addition, a network connecting the user terminal 90, the order controlling server 10, the image processing server 20 and the charging & settlement server 40 with each other is a network to which people can have access, such as the Internet, or the like. A network connecting the order controlling server 10, the image processing server 20, the image storing server 30, the order receiving server 50 the print out apparatus 60 the merchandise assembling apparatus 70 and the shipping terminal 80 with each other is a network configured between business operators, such as a so-called intranet or the like. In other words, in the merchandise order receiving system, a plurality of user terminals 90 are to be connected to the network connecting the order controlling server 10, the image processing server 20 and the charging & settlement server 40 with each other.

The order controlling server 10 includes an order computer 11 for performing the whole processing at the date of receiving order for merchandise and the generation of various kinds of data, and an order database 12 for storing various kinds of information concerning the reception of orders of merchandise as a database.

The order computer 11 makes a display section (not shown in the figures) of the user terminal 90 display a predetermined initial screen for ordering when connection is requested from the user terminal 90. Various kinds of information indicating ordered contents are supplied to the order computer 11 from the user terminal 90 as order data, the order computer 11 performs various kinds of processing concerning ordering based on the order data. More specifically, the order computer 11 performs user inquiry when a request for an order is transmitted from the user terminal 90. When the user is a qualified person as a result of the inquiry, the order computer 11 makes the display section display a predetermined menu screen for ordering on the display screen of the user terminal 90. According to a selection operation from the user terminal 90 with the menu screen, the order computer 11 supplies a preview display instruction control signal for making the display section of the user terminal 90 display a preview image to be a base image of a hologram to be incorporated to the merchandise, to the image processing server 20. When a confirmation control signal indicating an order after the confirmation of the preview image is supplied to the order computer 11 from the user terminal 90, then the order computer 11 makes the display section of the user terminal 90 display a predetermined payment method screen concerning the payment of charge. In response to a selection operation from the user terminal 90 at the payment method screen, the order computer 11 supplies a charging instruction control signal instructing charging to the charging & settlement server 40. Moreover, when a charging completion control signal indicating the completion of charging processing is supplied to the order computer 11 from the charging & settlement server 40, the order computer 11 supplies a reception completion control signal indicating the completion of receiving the order to the user terminal 90, and, further, the order computer 11 supplies receiving data indicating the contents of the order to the order receiving server 50. The order computer 11 generates information concerning the order that indicates the contents of the order as various kinds of information concerning the reception of the order, and the information is supplied to the order database 12.

The order database 12 includes a large capacity storage medium such as a hard disk drive, and the order database 12 stores various kinds of information concerning the reception of an order generated by the order computer 11 as a database.

The various kinds of information concerning the reception of an order to be stored in the order database 12 are composed of, for example, as shown in FIG. 2, "Order Number" indicating an identification number for each order, "Password" for certifying the qualification for accessing merchandise and its image data composed of character information and/or image information, "Order Date" indicating each ordered date, "Ordered Merchandise" indicating each ordered merchandise, "Classification of Merchandise" indicating the classification of each ordered merchandise, "Quantity" and "Ordered Price" indicating the quantity and the price of each ordered merchandise respectively, "Charging Number" generated at every charging operation as an identification number of the charging operation, "Addressee's Name" and "Addressee's Address", both indicating the addressee of each merchandise as final shipping article, "Character & Image Data" indicating the character information and/or the image information, both constituting the base image data of each hologram to incorporated in each merchandise as a printed matter, "Processed Image Data" indicating the base image data of each hologram made by the processing of the character information and/or the image information, and "Shipping Date" indicating the shipping date of each merchandise.

As for "Order Number", each order is given its identification number such as "JPODR001", "JPODR002", "JPODR004" and "JPODR005". "Password" is composed of a character string made by a random combination of, e.g. alphabet characters and numerals, and each order is given its own information such as "468ace02", "97531fdb", "94628462" and "37286742" as its password. "Order Date" indicates the date when each order is given, e.g. in year/month/date form. "Ordered Merchandise" indicates an ordered merchandise such as "Computer", "Digital Still Camera", "Note book" and "Cellular Phone" is given as an example of "Ordered Merchandise". That is, various electric apparatuses such as video apparatus, audio apparatus and communication apparatus, various recording media such as the so-called magneto optical (MO), the so-called compact disc (CD) and the so-called digital versatile disc (DVD) and their cases for protection and transport, stationery such as a notebook, a fountain pen and a ball-point pen, a book, a toy and the like are included. Still, "Merchandise" is not limited to such examples and may include any other kind of electronic apparatus, appliances or the like, as well as other articles of manufacture such as clothing, various kinds package such as boxes, cartons, etc. for food or the like, printed matter and, further, articles, commodities, values or the like that can be subject to selling, trade and/or are negotiable, etc. "Classification of Merchandise" indicates a classification for each ordered merchandise, and for example, the "Color" of each merchandise, when applicable, is given to each merchandise as its classification. "Quantity" indicates the quantity of ordered merchandise, and "Ordered Price" indicates each price designated by the unit price of each ordered merchandise multiplied by its quantity. Each request for charge is given its own identification number such as "JPPAY797", "JPPAY798", "JPPAY800" and "JPPAY801" as its "Charging Number". "Addressee's Name" indicates the name corresponding to the addressee for each ordered merchandise, and the name is, e.g. the name of each user who is a customer. "Addressee's Address" indicates each address corresponding to the addressee of each ordered merchandise, and the address is, e.g., the address of each user. "Character & Image Data" are link information to the character information and/or the image information, both constituting the base image data of a hologram to be incorporated to each ordered merchandise, and own identification numbers, e.g. "JPCHR001" and "JPCHR003", of character information and own identification numbers, e.g. "JPGRH002" and "JPGRH004", of image information are given as "Character & Image Data". "Processed Image Data" are the link information to the base image data of a hologram to be incorporated into each ordered merchandise, and own identification numbers, e.g., "JPIMG001", "JPIMG002", "JPIMG004" and "JPIMG005", of image data are given as "Processed Image Data". "Shipping Date" indicates the shipping date of each merchandise in an information form, e.g. "Year/Month/Day".

The order database 12 stores such information to be generated corresponding to a plurality of orders as a database. Various kinds of information are read from the order database 12 by the order computer 11 as the need arises.

This order controlling server 10 receives the order for a merchandise and generates the information concerning the reception of the order.

The image processing server 20 includes a processing computer 21 for performing image processing.

When a preview display instruction control signal for instructing the (not shown) display section of the user terminal 90 to display an image is supplied to the processing computer 21 from the order controlling server 10, the processing computer 21 supplies a data request control signal indicating the request of the character information and/or the image information, both constituting the image data to be displayed, to the image storing server 30. Then, the processing computer 21 processes the character information and/or the image information that are read in response to the data request control signal as the need arises, and the processing computer 21 supplies the character information and/or the image information to the user terminal 90 as a preview image to make the display section display the preview image. The processing computer 21 performs as its image processing such as the processing for converting the character information and/or the image information that are stored in the image storing server 30 in a form suitable for making a hologram of the information in a form suitable for a preview display, and the processing for synthesizing a plurality of kinds of character information and/or image information according to demand.

This image processing server 20 processes such character information and/or such image information to generate a preview image for performing the preview display of an image similar to the reproduced image of a hologram to be incorporated in the merchandise as a printed matter.

The image storing server 30 includes an image computer for performing control at the date of storing image data, the generation of various kinds of data and the like, and an image database 32 for storing various kinds of information concerning the storage of image data as a database.

The image computer 31 makes the image database 32 equipped with a (not shown) large capacity storage medium such as a hard disk drive store various kinds of character information and/or image information as image data. As the character information and/or the image information, for example, information obtained by the previous imaging with an imaging apparatus or the like, or the information generated by computer graphics (CG) can be cited. That is, the image computer 31 makes the image database 32 store various kinds of character information and/or image information for making the base image data of a hologram as image data. Moreover, the image computer 31 generates various kinds of information concerning image data indicating the contents of the image data corresponding to the stored character information and/or the stored image information. The image computer 31 supplies the information to the image database 32 for making the image database 32 store the supplied information. Furthermore, the image computer 31 reads the requested character information and/or the requested image information from the image database 32 in response to a data request control signal supplied from the receiving server 50 and the print out apparatus 60. The image computer 31 supplies the read character information and/or the read image information to the print out apparatus 60. Furthermore, the image computer 31 reads the requested character information and/or the requested image information from the image database 32 in response to a data request control signal supplied from the image processing server 20. The image computer 31 supplies the read character information and/or the read image information to the image processing server 20.

The image database 32 includes a large capacity storage medium such as a hard disk drive. The image database 32 stores various kinds of image data under the control of the image computer 31, and stores various kinds of information that concern image data and are generated by the computer section 31 as a database.

The various kinds of information that concern the image data and are stored in the image database 32 are, for example, as shown in FIG. 3, composed of "Processed Image Data" indicating the base image data of a hologram, "Registration Date (Order Date)" indicating dates when the character information and/or the image information are stored as image data, and the image data corresponding to "Processed Image Data".

Each image data is given its own identification number such as "JPIMG001", "JPIMG002", "JPIMG004", "JPIMG005", "JPIMG007" and "JPIMG008" as "Processed Image Data". "Registration Date (Order Date)" indicates each date when image data is stored in the image computer 31 or each date when each order is given. "Image Data" are the link information to the stored image data, and indicate the classifications of images as the need arises.

The image database 32 stores such information generated corresponding to a plurality of image data as a database. Various kinds of information are read from the image database 32 by the image computer 31 as the need arises.

This image storing server 30 stores various kinds of image data, and generates the information concerning image data.

The charging & settlement server 40 includes a charging computer 41 for performing processing for charging and settlement and the generation of various kinds of data, and a charging database 42 for storing various kinds of information concerning charging and settlement as a database.

When a charging instruction control signal for instructing charging is supplied to the charging computer 41 from the order controlling server 10, the charging computer 41 requests payment information, which is the information concerning a payment method necessary for the payment of charge, against the user terminal 90. Then, when the charging computer 41 receives the payment information from the user terminal 90 as order data, the charging computer 41 executes its charging processing. And then, the charging computer 41 supplies a payment completion control signal indicating the completion of payment to the user terminal 90. Moreover, the charging computer 41 supplies a charging completion control signal indicating the completion of the charging processing to the order controlling server 10. The charging computer 41 generates various kinds of information concerning the charging and the settlement, both indicating the contents of charging processing based on the order data at the date of the processing to make the charging database 42 store the information.

The charging database 42 includes a large capacity storage medium such as a hard disk drive. The various kinds of information that concern charging and settlement and are generated by the charging computer 41 are stored in the charging database 42 as a database.

The various kinds of information that concern charging and settlement and are to be stored in the charging database 42 are, for example, as shown in FIG. 4, composed of "Charging Number" indicating the own identification number of each request of a charge, "Charging Date" indicating the date of the commencement of charging processing, "Amount of Charging (Ordered Price)", "Payment Method", "Name of Financial institution", "Card Number & Account Number" and "Status of Settlement".

"Charging Number" indicates the identification number of each request for charge. "Charging Date" indicates the date of the commencement of charging processing. "Amount of Charging (Ordered Price)" indicates the charge of an ordered printed matter. "Payment Method" indicates the method of the payment of each charge such as the payment of the charge by debit from a bank account. In the columns of "Payment Method", for example, the information of "Credit Card" is recorded when a user chooses the payment by credit card, and the information of "Bank Account" is recorded when a user chooses the payment by debit from a bank account. "Name of Financial institution" indicates the name of a financial institution corresponding to each payment method. In the columns of "Name of Financial institution", for example, the name of a credit card company is recorded when a user chooses the payment with a credit card, and the name of a bank is recorded when a user chooses the payment from the user's banking account, for example. "Card Number & Account Number" indicates each card number corresponding to each payment method. In the columns of "Card Number & Account Number", for example, the credit card number of a user is recorded when the user hopes the payment with the credit card, and the cash card number of a bank of a user is recorded when the user hopes the payment from the bank account. "Settlement Status" indicates each progressing status of charging processing such as "Pending" and "Received".

The charging database 42 stores such information generated corresponding to a plurality of status of charging processing as a database. Various kinds of information are read from the charging database 42 by the charging computer 41 as the need arises.

This charging & settlement server 40 carries out the whole processing concerning charging and settlement, and generates information concerning charging and settlement.

The order receiving server 50 includes an order receiving computer 51 for performing the whole processing concerning the order receiving of the delivering of each merchandise and the generation of various kinds of data, and an order receiving database 52 for storing various kinds of information concerning order receiving as a database.

The order receiving computer 51 generates various kinds of information concerning order receiving based on the aforesaid order data supplied from the order controlling server 10 to supply the information to the order receiving database 52. Moreover, the order receiving computer 51 generates a printing instruction control signal instructing the printing of an image. The order receiving computer 51 supplies the printing instruction control signal to the print out apparatus 60, and further, the order receiving computer 51 supplies a data request control signal indicating the request of image data to be printed to the image storing server 30.

The order receiving database 52 includes a large capacity storage medium such as a hard disk drive, and stores various kinds of information that concern order receiving and are generated by the order receiving computer 51 as a database.

The various kinds of information that concern order receiving and are to be stored in the order receiving database 52 were generated by the order receiving computer 51 based on the aforesaid order data supplied from the order controlling server 10. The various kinds of information are composed of, for example, as shown in FIG. 5, the elements of "Order Number", "Password", "Order Date", "Ordered Merchandise", "Classification of Merchandise", "Order Quantity", "Addressee's Name", "Addressee's Address", "Character & Image Data" and "Processed Image Data". The information concerning order reception is used as it is as the information except for "Character & Image Data" among various kinds of information. Moreover, "Character & Image Data" are the link information to corresponding character information and image information, and also indicates the classification of the character information and the image information as the need arises.

The order receiving database 52 stores such information generated corresponding to a plurality of kinds of order receiving as a database. Various kinds of information are read from the order receiving database 52 by the order receiving computer 51 as the need arises.

This order receiving server 50 performs the whole processing concerning the order receiving of the shipping of each merchandise, and generates the information concerning each order receiving indicating the contents of the order received.

The print out apparatus 60 includes an output computer 61 for performing the whole processing at the date of outputting a hologram as a printed matter, and a printer 62 for outputting a printed matter.

When a printing instruction control signal instructing the printing of an image is provided to the output computer 61 from the order receiving server 50, the output computer 61 supplies a data request control signal indicating the request of character information and/or image information to be printed as a hologram to the image storing server 30, and the output computer 61 makes the printer 62 print the character information and/or the image information, both being read in response to the data request control signal, as a hologram. In addition, a user who is a customer can arbitrarily designate the character information and/or the image information by using, for example, his/her own name or other desired characters and/or images. When the printing ends, the output computer 61 supplies a print ending control signal indicating the ending of printing, together with the generated printed matter of the hologram to the merchandise assembling apparatus 70.

The printer 62 prints character information and/or image information as a hologram under the control of the output computer 61 to discharge it to the outside. The hologram is supplied to the merchandise assembling apparatus 70 by the output computer 61.

This print out apparatus 60 prints the designated character information and/or the designated image information, and generates a printed matter including a hologram.

The merchandise assembling apparatus 70 includes an assembling computer section 71 for executing the whole control at the date of assembling the merchandise as a final shipping good or matter to be delivered, and an assembling section 72 for physically assembling the merchandise.

When a print ending control signal indicating the end of printing is supplied to the assembling computer section 71 from the print out apparatus 60, the assembling computer section 71 performs various kinds of processing for performing the incorporation operation/process of a printed matter including a hologram into the merchandise. More specifically, the assembling computer section 71 executes the processing such as the examination of the propriety of the correspondence between the merchandise and the designated printed matter. When the incorporation of a printed matter in the merchandise is completed, the assembling computer section 71 supplies an assembling completion control signal indicating the completion of a merchandise together with the assembled merchandise as final shipping good to the shipping terminal 80.

The assembling section 72 includes an apparatus such as a robot mechanism or the like for performing the physical assembling work, and is managed under the control of the assembling computer 71. Alternatively, such assembling section 72 can be replaced by human manual operation, so that the assembling section 72 as an apparatus can be omitted. The merchandise is assembled at the assembling section 72 as a final shipping or delivery good by incorporating the printed matter to the merchandise by attaching the printed matter to the merchandise though various kinds of attaching means. The merchandise is supplied to the shipping terminal 80 under the control of the assembling computer 71.

This merchandise assembling apparatus 70 incorporates a printed matter to the merchandise to assemble the merchandise as a final shipping good.

The shipping terminal 80 includes a shipping computer 81 for performing the whole processing at the date of shipping of the merchandise.

When an assembling completion control signal indicating the completion of merchandise is supplied to the shipping computer 81 from the merchandise assembling apparatus 70, the shipping computer 81 performs various kinds of processing for the preparation for shipping. More specifically, the shipping computer 81 generates the information such as an addressee, merchandise or the like for shipping the designated merchandise to the right addressee. The merchandise is forwarded when the preparation for shipping by the shipping computer 81 is completed. As forms of shipping, for example, transportation entrusted to a transport/cargo/delivery company or the like, a mailing company and/or the like can be considered. The shipping computer 81 generates shipping information indicating the shipping of the merchandise, and records the information in, for example, a hard disk drive or the like, or displays the information on a display section. At this event, the shipping computer 81 accesses to the order receiving server 50 as the need arises, and reads various kinds of information concerning order receiving stored in the order receiving database 52 with the order receiving computer 51.

This shipping terminal 80 performs various kinds of processing such as the generation of various kinds of information necessary for the shipping of the merchandise to a user that is a right addressee.

The user terminal 90 includes a user computer 91 operated by the user.

The user computer 91 can be an apparatus under the possession of a user (a customer), and the computer section 91 is an apparatus such as a personal computer, a cellular phone, or a portable information terminal such as a portable digital assistant (PDA), capable of connecting with a network such as the Internet. The user computer 91 makes a connection request to the order controlling server 10 by a predetermined connection business operator at the date of performing the order for the merchandise. When connection is permitted, the user computer 91 downloads the aforesaid predetermined initial screen for order from the order controlling server 10, and displays the initial screen on the display section thereof (not shown in the figures). Moreover, When a user makes an order request by operating buttons, an icon or the like on the initial screen, the user computer 91 supplies the aforesaid order data to the order controlling server 10 in response to the request for the order data from the order controlling server 10. When the order is permitted as a result thereof, the user computer 91 downloads the aforesaid predetermined menu screen for order from the order controlling server 10, and the user computer 91 displays the menu screen on the display section. Furthermore, the user computer 91 downloads a preview image of a hologram incorporated as a printed matter in the ordered merchandise from the image processing server 20, and the user computer 91 displays the preview image on the display section. When the user identifies the preview image and performs a predetermined operation for indicating the decision of the order in response to the display of the preview image, the user computer 91 supplies the aforesaid confirmation control signal to the order controlling server 10. Then, the user computer 91 downloads the aforesaid predetermined payment method screen from the order controlling server 10, and displays the payment method screen on the display section. By the user's operation of the button or the like on the payment method screen for the selection of a payment method, the user computer 91 supplies a payment method control signal indicating the selected payment method to the order controlling server 10. Furthermore, by the user's input of the predetermined payment information with an operation section (not shown in the figures) in response to the request of the aforesaid payment information from the charging & settlement server, the user computer 91 supplies the payment information to the charging & settlement server 40 as the aforesaid order data. Then, the user computer 91 receives the supply of the aforesaid payment completion control signal from the charging & settlement server 40, and receives the aforesaid reception completion control signal from the order controlling server 10.

This user terminal 90 works as a user interface at the date of ordering, and the user terminal 90 is also a communication terminal enabling a user to perform the shipping of information between an business operator through a network.

Figure 6:
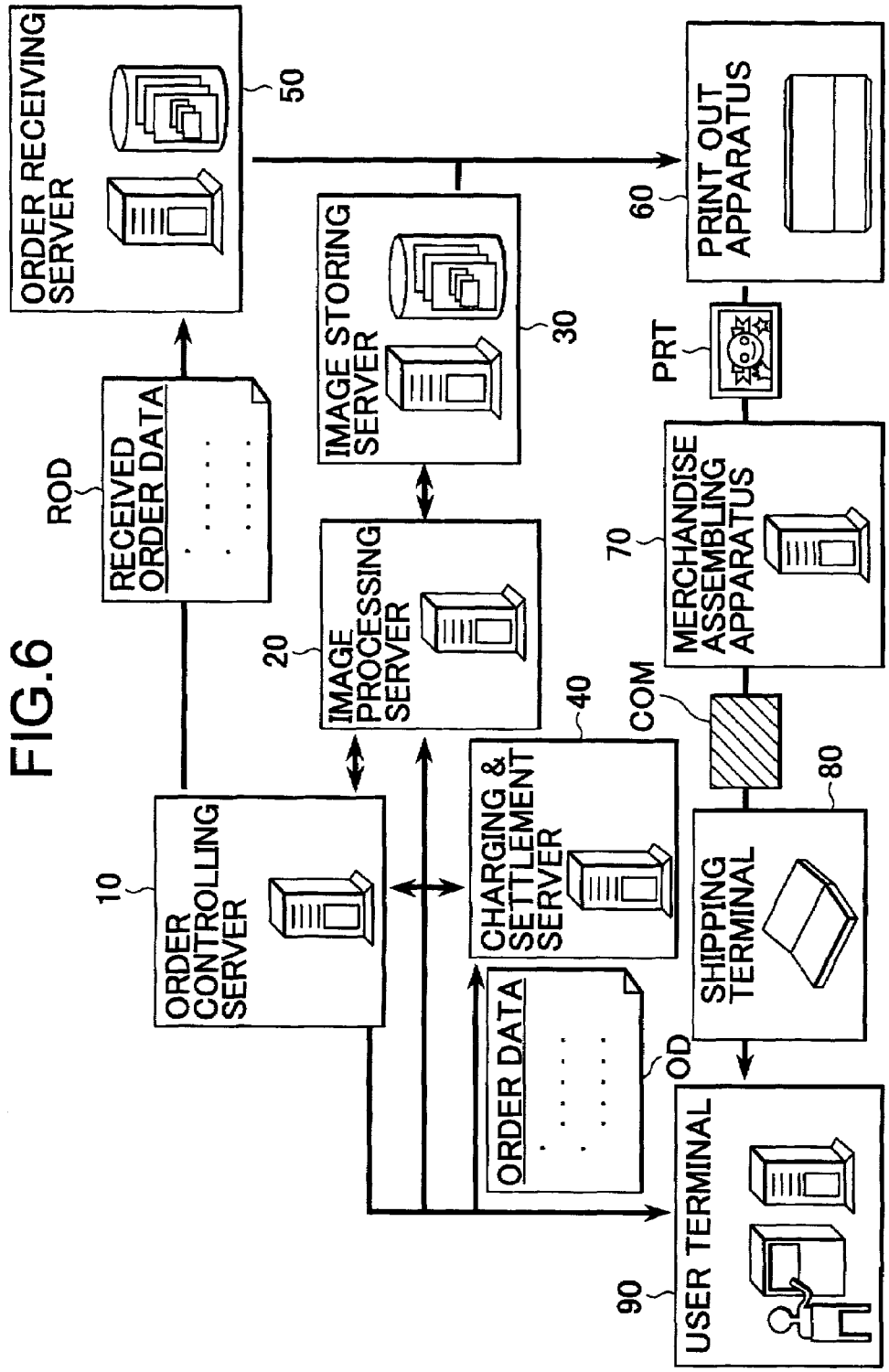
FIG. 6 is a diagram for illustrating information delivered between each apparatus in the merchandise order receiving system.

Now, the merchandise order receiving system composed of each apparatus like described above performs the shipping of information between each apparatus as shown in FIG. 6, and receives an order for the delivery of a merchandise. In the following, merchandise or a product/good/article/commodity or the like before the incorporation of a printed matter like a hologram is simply referred to as "merchandise", and merchandise as final shipping good after the incorporation of the printed matter is referred to as "assembled merchandise" as need arises as a matter of convenience.

In the merchandise order receiving system, the whole processing is commenced by the accessing of a user to the order controlling server 10 with the user terminal 90 first. In the merchandise order receiving system, a user transmits order data OD to the order controlling server 10 with the user terminal 90. In the merchandise order receiving system, when an assembled merchandise MER, in which a printed matter PRT is incorporated into the merchandise, is ordered in such a way, the image processing server 20 reads the designated character information and/or the designated image information from the image storing server 30 as image data, and the predetermined image processing is performed to the read image data. The image data obtained as a result of the processing are downloaded to the user terminal 90 as a preview image, and are displayed on the display section of the user terminal 90. In the merchandise order receiving system, when a user identifies a preview image, the payment information as the aforesaid order data OD is delivered between the user terminal 90 and the charging & settlement server 40, and thereby the charging processing is performed. In the merchandise order receiving system, the order controlling server 10 generates the aforesaid order receiving data ROD corresponding to the charging processing. By the supply of the order receiving data ROD to the order receiving server 50, the order of the assembled merchandise MER is received. Then, in the merchandise order receiving system, the image storing server 30 and the print out apparatus 60 operate to generate a printed matter PRT of a hologram in response to a print instruction from the order receiving server 50, and the merchandise assembling apparatus 70 generates an assembled merchandise MER. The assembled merchandise MER is forwarded to the user through the shipping terminal 80.

In the merchandise order receiving system, the delivery of information is performed in such way as described above and then the assembled merchandise MER, to which the printed matter PRT is incorporated, reaches the user.

Figure 7:
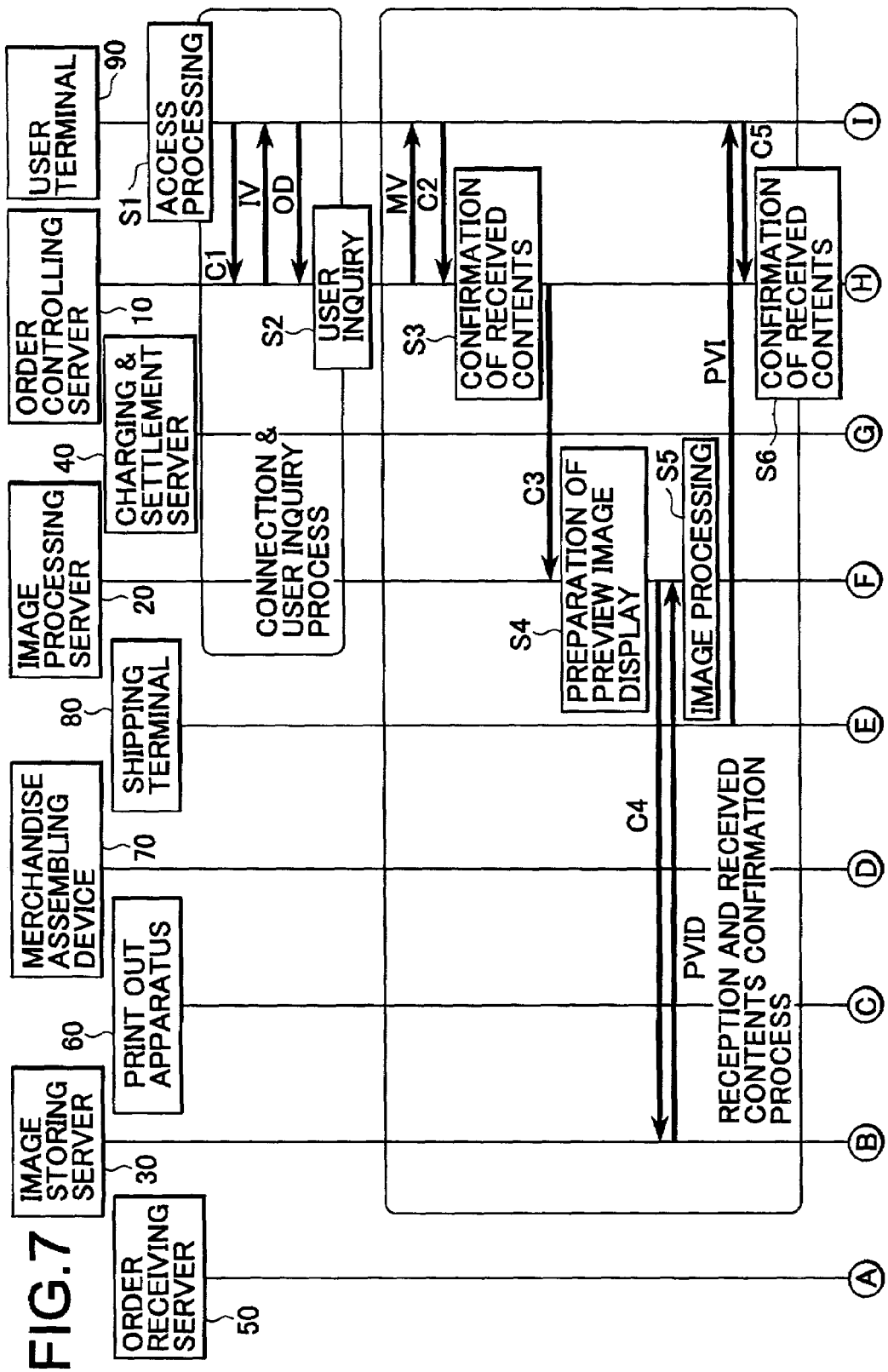
FIG. 7 is a diagram for illustrating a series of processing processes in the merchandise order receiving system, illustrating connection & user inquiry user inquiry process and reception & received contents confirmation processes.
Figure 8:
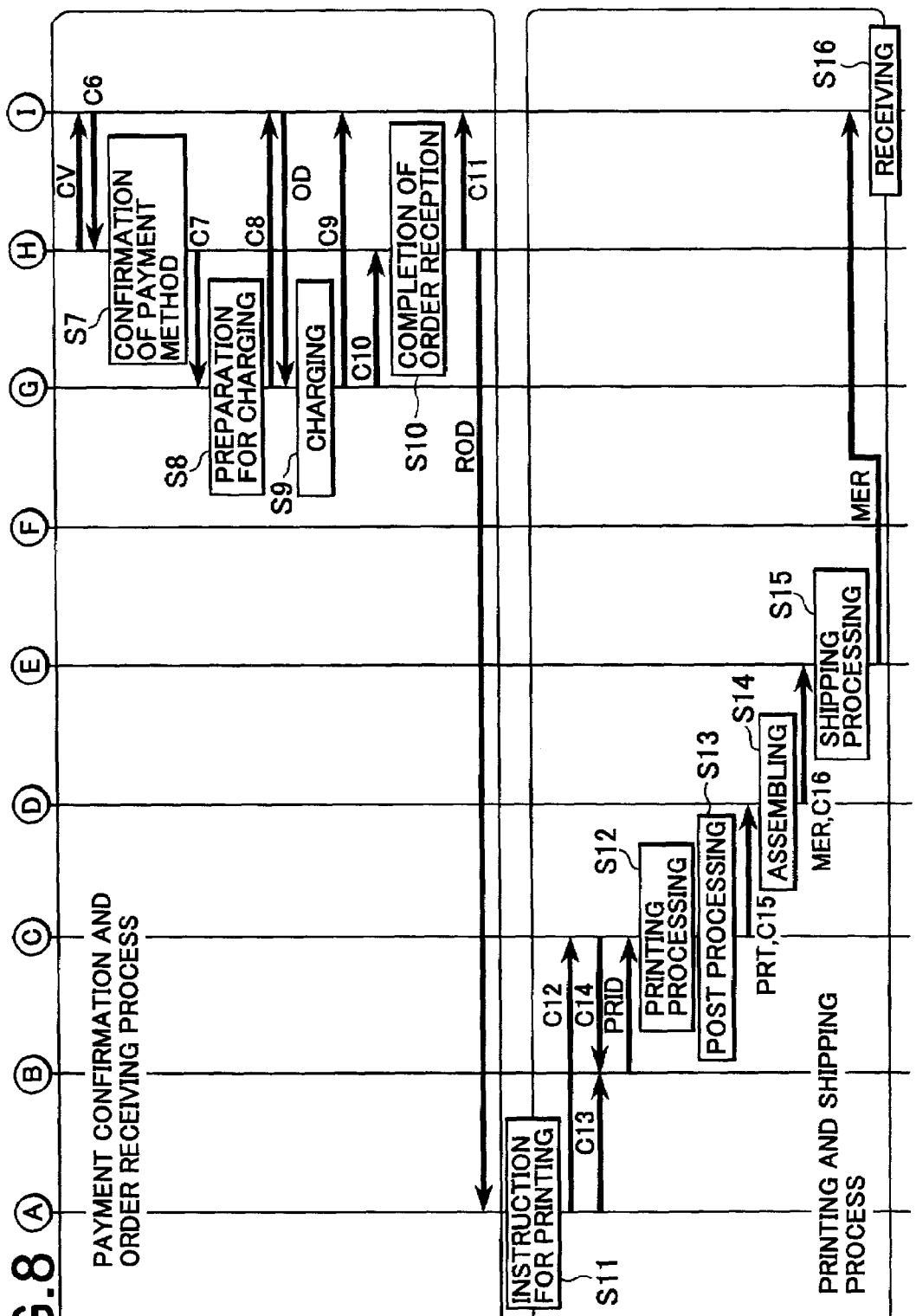
FIG. 8 is a diagram for illustrating a series of the processing processes in the merchandise order receiving system, illustrating payment confirmation & order receiving processes and printing & shipping process.

In more specific terms, the merchandise order receiving system receives an order for shipping of an assembled merchandise MER by performing a series of processing as shown in FIG. 7 and FIG. 8. FIG. 7 and FIG. 8 show the contents of the processing of each apparatus in the merchandise order receiving system as well as the timing of the delivery of information between each apparatus. Moreover, the user terminal 90 in FIG. 7 and FIG. 8 may designate a user that happens to be a customer.

The processes of ordering an assembled merchandise MER in the merchandise order receiving system are roughly divided into four processes, i.e. connection & user inquiry process, reception and received contents confirmation processes, payment confirmation and order receiving processes, and printing and shipping process.

At first, in the merchandise order receiving system, as shown in FIG. 7, the connection & user inquiry process is performed. In the merchandise order receiving system, at step S1, the user terminal 90 performs access processing to the order controlling server 10. The access processing is for example the following processing. That is, a user starts the so-called browse software for browsing the so-called Web site, and inputs a uniform resource locator (URL) indicating the Web site for performing an order with a not shown operation section to try the establishment of communication between the user terminal 90 and the order controlling server 10 through a predetermined connection operator. In the merchandise order receiving system, a connection request control signal C1 for requesting connection is supplied from the user terminal 90 to the order controlling server 10 in response to the access processing. Thereby, in the merchandise order receiving system, when the connection is permitted, the aforesaid predetermined initial screen IV is downloaded from the order controlling server 10 to the user terminal 90 to be displayed on the not shown display section of the user terminal 90.

Next, in the merchandise order receiving system, by the user's input of the predetermined information with an operation section, order data OD are generated. By the uploading of the generated order data OD to the order controlling server 10, the order data OD are supplied from the user terminal 90 to the order controlling server 10.

Then, in the merchandise order receiving system, at step S2, the order controlling server 10 performs user inquiry. However, the user inquiry is not always performed. If accessing right to merchandise and image data is limited, the user inquiry is performed by the inspection of the aforesaid password based on the order data OD.

Then, in the merchandise order receiving system, when the eligibility of a user is certified and the user's order is permitted, the reception and received contents confirmation processes are performed. In the merchandise order receiving system, the aforesaid predetermined menu screen MV is downloaded from the order controlling server 10 to the user terminal 90 to be displayed on the display section of the user terminal 90. In the merchandise order receiving system, a user selects a desired merchandise to be ordered and a desired image data, which are composed of character information and/or image information and are incorporated in the merchandise as a printed matter PRT of a hologram, in the menu displayed on the menu screen MV And, by the operation of a selection button for the selection of the merchandise and the image data in the operation section, the order of the merchandise and the image data is performed. In the merchandise order receiving system, a selection control signal C2 indicating the selected merchandise and the selected image data is supplied from the user terminal 90 to the order controlling server 10 in response to the selection operation. Thereby, in the merchandise order receiving system, at step S3, reception contents such as the selected merchandise, the selected image data and an ordered quantity are confirmed by the order controlling server 10.

Then, in the merchandise order receiving system, a preview display instruction control signal C3 for making the display section of the user terminal 90 displaying a preview image based on the selected image data is supplied from the order controlling server 10 to the image processing server 20. Thereby, in the merchandise order receiving system, at step S4, the image processing server 20 performs the predetermined preparation processing for performing the display of a preview image to the user terminal 90. Then, in the merchandise order receiving system, a data request control signal C4 indicating the request for the image data to be displayed as preview display is supplied from the image processing server 20 to the image storing server 30.

Consecutively, in the merchandise order receiving system, image data PVID is read from the image storing server 30 in response to the data request control signal C4 to be supplied to the image processing server 20. In the merchandise order receiving system, at step S5, the image processing server 20 performs a predetermined image processing of the image data PVID to supply the processed image data PVID to the user terminal 90 as a preview image PVI. The preview image PVI is displayed on the display section in the user terminal 90.

Then, in the merchandise order receiving system, when the user identifies the preview image PVI and performs a predetermined operation indicating the decision of the order of the assembled merchandise MER incorporating the printed matter PRT of the hologram having the same contents as the preview image PVI into the merchandise, the user terminal 90 supplies a confirmation control signal C5 indicating the confirmation of the preview image PVI and the order of the assembled merchandise MER to the order controlling server 10. In the merchandise order receiving system, at step S6, the order controlling server 10 verifies the final reception contents.

Next, in the merchandise order receiving system, as shown in FIG. 8, the payment confirmation and order receiving process is performed. In the merchandise order receiving system, the aforesaid predetermined payment method screen CV is downloaded from the order controlling server 10 to the user terminal 90 to be displayed on the display section of the user terminal 90. In the merchandise order receiving system, a user selects a desired payment method in the menu displayed in the payment method screen CV and operates the selection button for the selection of the payment method with the operation section, and thereby the payment method control signal C6 is supplied from the user terminal 90 to the order controlling server 10. Then, in the merchandise order receiving system, at step S7, the order controlling server 10 verifies the payment method, and a charging instruction control signal C7 instructing charging is supplied to the charging & settlement server 40.

Consecutively, in the merchandise order receiving system, at step S8, the charging & settlement server 40 performs predetermined preparation processing for executing charging processing, and the charging & settlement server 40 supplies a payment information request signal C8 for requesting the aforesaid payment to the user terminal 90. With this, in the merchandise order receiving system, by the user's input of the predetermined payment information with the operation section of the user terminal 90, the payment information is generated as the aforesaid order data OD by the user terminal 90 to be supplied to the charging & settlement server 40. In the merchandise order receiving system, when the order data OD are supplied from the user terminal 90 to the charging & settlement server 40, at step S9, the charging & settlement server 40 executes the charging processing.

Then, in the merchandise order receiving system, a payment completion control signal C9 indicating the completion of the payment is supplied from the charging & settlement server 40 to the user terminal 90, and a charging completion control signal C10 indicating the completion of the charging processing is supplied from the charging & settlement server 40 to the order controlling server 10. In the merchandise order receiving system, at step S10, the order controlling server 10 performs the processing for completing the order reception to supply a reception completion control signal C11 indicating the completion of the reception from the order controlling server 10 to the user terminal 90, and further the aforesaid order receiving data ROD are supplied from the order controlling server 10 to the order receiving server 50.

In succession, in the merchandise order receiving system, the printing and shipping process are performed. In the merchandise order receiving system, at step S11, the order receiving server 50 generates a printing instruction control signal C12 for instructing the printing of an image to be supplied to the print out apparatus 60. Moreover, in the merchandise order receiving system, data request control signals C13 and C14 indicating the request of the image data to be printed are supplied from the order receiving server 50 and the print out apparatus 60 to the image storing server 30. With this, in the merchandise order receiving system, image data PRID to be printed are read from the image storing server 30 in response to the data request control signals C13 and C14 to be supplied to the print out apparatus 60.

Next, in the merchandise order receiving system, at step S12, the print out apparatus 60 performs the printing processing of the image data PRID, and further, at step S13, the print out apparatus 60 performs the post processing of the printing as the need arises. As the post processing of the printing, for example, predetermined heating processing of a hologram can be considered. Moreover, the post processing of the printing also includes processing such as cutting of a printed matter into a predetermined size and attaching of a printed matter to a predetermined mounting.

In succession, in the merchandise order receiving system, the print out apparatus 60 supplies a print ending control signal C15 indicating the ending of printing together with the printed matter PRT of a generated hologram to the merchandise assembling apparatus 70. As a result, in the merchandise order receiving system, at step S14, the merchandise assembling apparatus 70 performs incorporation work to generate an assembled merchandise MER.

Then, in the merchandise order receiving system, an assembling completion control signal C16 indicating the completion of a merchandise is supplied together with the generated assembled merchandise MER from the merchandise assembling apparatus 70 to the shipping terminal 80. With this, in the merchandise order receiving system, at step S15, the shipping terminal 80 performs predetermined shipping processing to forward the assembled merchandise MER to the user. The user, at step S16, receives the forwarded assembled merchandise MER, and the series of processing is ended.

As described above, in the merchandise order receiving system, a user can order and receive assembled merchandise MER, in which a printed matter PRT of a hologram made by the exposure and the recording of a designated character and/or a designated image is incorporated or attached.

As described above, the merchandise order receiving system shown as a first embodiment of the present invention delivers an assembled merchandise MER, in which a printed matter PRT of a hologram incorporated in the merchandise, and thereby a user being a customer can order his or her own exclusive assembled merchandise MER that does not exist in any other place. In particular, because the printed matter PRT is a hologram or the like, the printed matter PRT is difficult to copy by conventional resources. Consequently, the assembled merchandise MER becomes difficult to imitate. Moreover, the assembled merchandise MER has a high possibility of being recovered in the case in which the assembled merchandise MER is lost or stolen, because the printed matter PRT, i.e., its own information, is incorporated in the assembled merchandise MER.

On the other hand, from a business operator's point of view, the merchandise order receiving system allows manufacture of a variety of merchandise in small quantity or merchandise corresponding to individual preferences such as the so-called custom-made or customized merchandise in comparison with mass-produced uniform merchandise, and thereby the business operator can supply highly value added merchandise. Moreover, in the merchandise order receiving system, the order receiving for the merchandise is performed through network, and thereby the processes from the order of merchandise to the shipping of the merchandise can be simplified and the time required for processing can be shortened.

Next, descriptions are given to a merchandise order receiving system as a second embodiment of the present invention, in which a merchandise and a printed matter a hologram using a designated character and/or a designated image are delivered together. The merchandise order receiving system has the configuration composed of the apparatuses basically same as those of the merchandise order receiving system shown as the first embodiment of the invention. The configuration of the second embodiment system differs from that of the first embodiment system in the aspect of having a merchandise inventory apparatus instead of the aforesaid merchandise assembling apparatus. Accordingly, hereupon, each apparatus other than the merchandise inventory apparatus is designated by the same reference marks as those of the embodiment 1, and the detailed description thereof is omitted.

Figure 9:
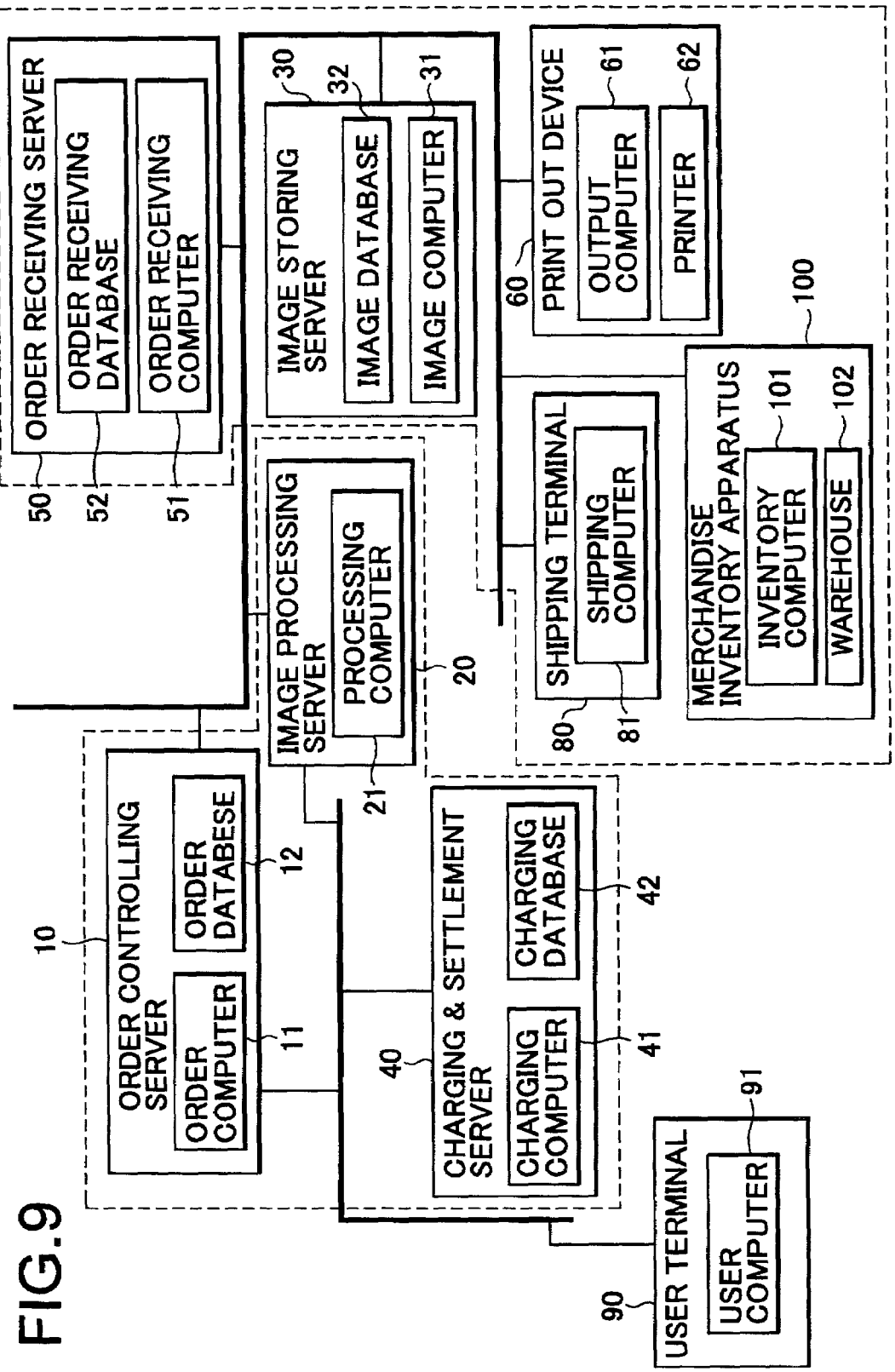
FIG. 9 is a block diagram for illustrating the configuration of a merchandise order receiving system as a second embodiment of the present invention.

The merchandise order receiving system is, as shown in FIG. 9, equipped with a merchandise inventory apparatus 100 besides the order controlling server 10, the image processing server 20, the image storing server 30, the charging & settlement server 40, the order receiving server 50, the print out apparatus 60, the shipping terminal 80, and the user terminal 90.

In the merchandise order receiving system, a network connecting the user terminal 90 with the order controlling server 10, the image processing server 20 and the charging & settlement server 40 is one such as the Internet. A network connecting the order controlling server 10 and the image processing server 20 with the image storing server 30, the order receiving server 50, the print out apparatus 60, the shipping terminal 80 and the merchandise inventory apparatus 100 is one such as an intranet, observed that the same Internet is also allowable in some cases. Then, in the merchandise order receiving system, a plurality of user terminals 90 are connected with the network connecting the order controlling server 10, the image processing server 20 and the charging & settlement server 40.

The print out apparatus 60, as mentioned above, includes the output computer 61 and the printer 62.

As mentioned above, when a printing instruction control signal for instructing the print of an image is supplied from the order receiving server 50 to the output computer 61, the output computer 61 supplies a data request control signal indicating the request of character information and/or image information to be printed as a hologram to the image storing server 30, and the output computer 61 makes the printer 62 print the character information and/or the image information, both being read in response to the data request control signal, as a hologram. Then, when the print ends, the output computer 61 supplies a print ending control signal indicating the ending of the print to the shipping terminal 80 and the merchandise inventory apparatus 100. Moreover, the output computer 61 supplies the generated printed matter including a hologram to the shipping terminal 80.

The printer 62 prints the character information and/or the image information as a hologram under the control of the output computer 61 to discharge the printed hologram as mentioned above. The hologram is supplied to the shipping terminal 80 by the output computer 61.

This print out apparatus 60 prints the designated character information and/or the designated image information to generate a printed matter including a hologram or the like.

The shipping terminal 80 includes the shipping computer 81 as described above.

As mentioned above, when a print ending control signal indicating the end of printing is supplied to the shipping computer 81 from the print out apparatus 60 and a merchandise preparation completion control signal indicating the completion of the preparation for a merchandise to be forwarded is supplied to the shipping computer 81 from the merchandise inventory apparatus 100, the shipping computer 81 performs various kinds of processing for the preparation for shipping. When the preparation for shipping by the shipping computer 81 is completed, the merchandise and the printed matter are delivered together with each other. The shipping computer 81 generates shipping information indicating the shipping of the merchandise and the printed matter, and the shipping computer 81 records the information on, for example, a hard disk drive or the like, and displays the information on the display section. At this date, the shipping computer 81, as mentioned above, accesses the order receiving server 50 to read various kinds of information that concerns order receiving and is stored in the order receiving database 52 with the order receiving computer 51 as the need arises.

This shipping terminal 80 performs various kinds of processing such as the generation of various kinds of information necessary for shipping merchandise and a printed matter together with each other to a user being a right addressee.

The merchandise inventory apparatus 100 includes a inventory computer 101 for performing the whole control concerning the inventory control of merchandise and a warehouse 102 for keeping merchandise actually in stock.

When a print ending control signal indicating the end of printing is supplied to the inventory computer 101 from the print out apparatus 60, the inventory computer 101 performs processing such as the investigation of the existence of a merchandise to be forwarded in the inventory under its control. When the preparation for a merchandise to be forwarded is completed, the inventory computer 101 supplies a merchandise preparation completion control signal indicating the completion of preparation of the merchandise together with the merchandise to the shipping terminal 80.

The warehouse 102 is composed of a warehouse for keeping various kinds of merchandise in stock, an apparatus for performing physical operation and the like. The warehouse 102 is managed under the control of the inventory computer 101 in order to prepare designated merchandise.

This merchandise inventory apparatus 100 prepares merchandise as a final shipping product to supply the merchandise to the shipping terminal 80.

Figure 10:
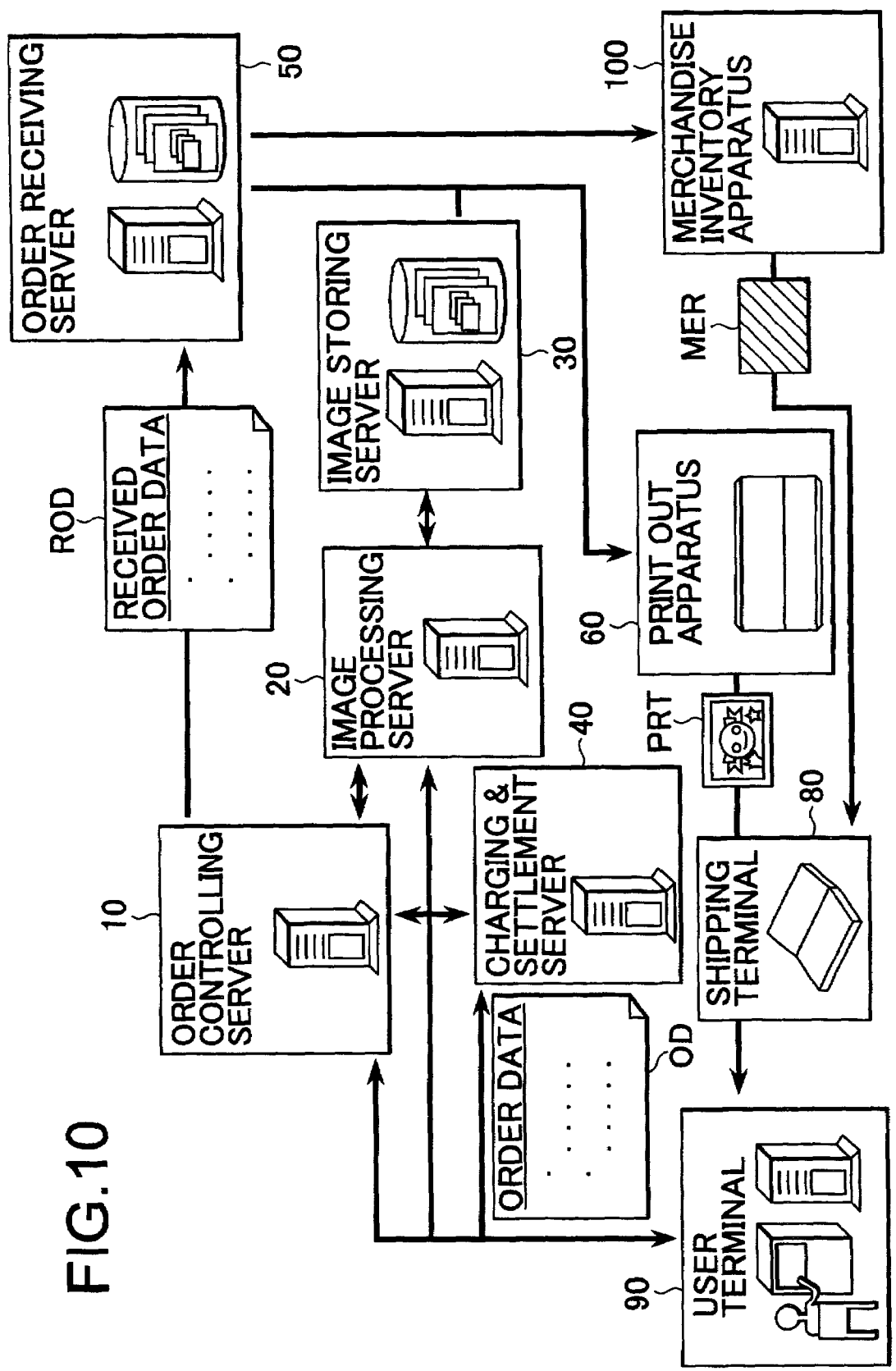
FIG. 10 is a diagram for illustrating information delivered between each apparatus in the merchandise order receiving system.

Now, the merchandise order receiving system composed of each apparatus like this performs the delivery of information between each apparatus as shown in FIG. 10, and receives an order for the shipping of a merchandise and a printed matter.

In the merchandise order receiving system, at first, a user accesses to the order controlling server 10 with the user terminal 90, and order data OD are transmitted to the order controlling server 10. In the merchandise order receiving system, when merchandise and a printed matter PRT are ordered in such way, the image processing server 20 reads the designated character information and/or the designated image information from the image storing server 30 as image data, and the predetermined image processing is performed to the read image data. The image data obtained as a result of the processing are downloaded to the user terminal 90 as a preview image, and are displayed on the display section of the user terminal 90. In the merchandise order receiving system, when a user identifies a preview image, the payment information as the aforesaid order data OD is delivered between the user terminal 90 and the charging & settlement server 40, and thereby the charging processing is performed. In the merchandise order receiving system, the order controlling server 10 generates the aforesaid order receiving data ROD corresponding to the charging processing. By the supply of the order receiving data ROD to the order receiving server 50, the order of the merchandise and the printed matter PRT are received. Then, in the merchandise order receiving system, the image storing server 30 and the print out apparatus 60 operate to generate the printed matter PRT of a hologram in response to a print instruction from the order receiving server 50, and the merchandise inventory apparatus 100 prepares the merchandise. The merchandise and the printed matter PRT are forwarded together to the user through the shipping terminal.

In the merchandise order receiving system, the delivery of information is performed in such way, and then the merchandise and the printed matter PRT reach the user.

Figure 11:
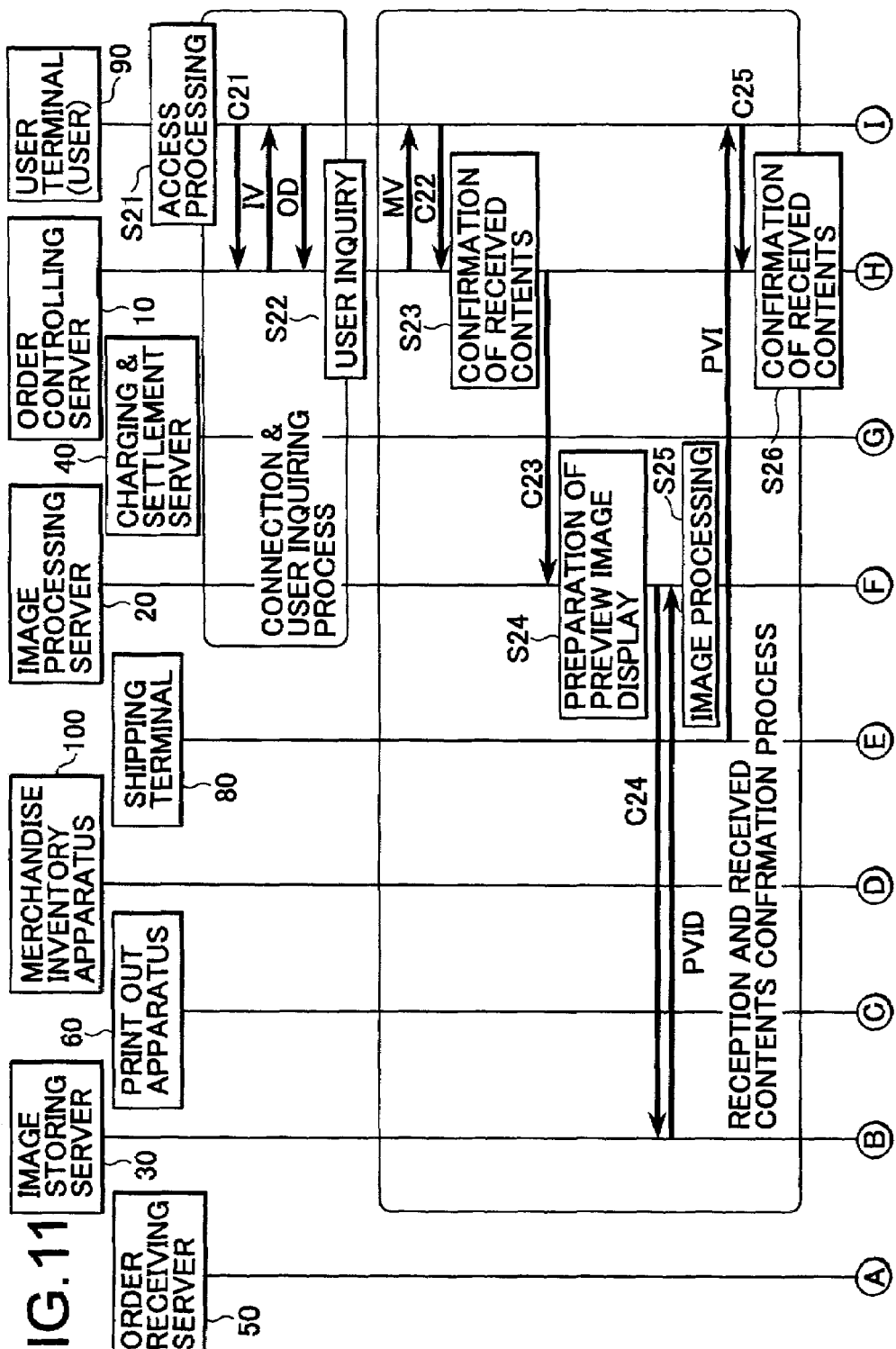
FIG. 11 is a diagram for illustrating a series of processing processes in the merchandise order receiving system, illustrating connection & user inquiry process and reception & received contents confirmation processes.
Figure 12:
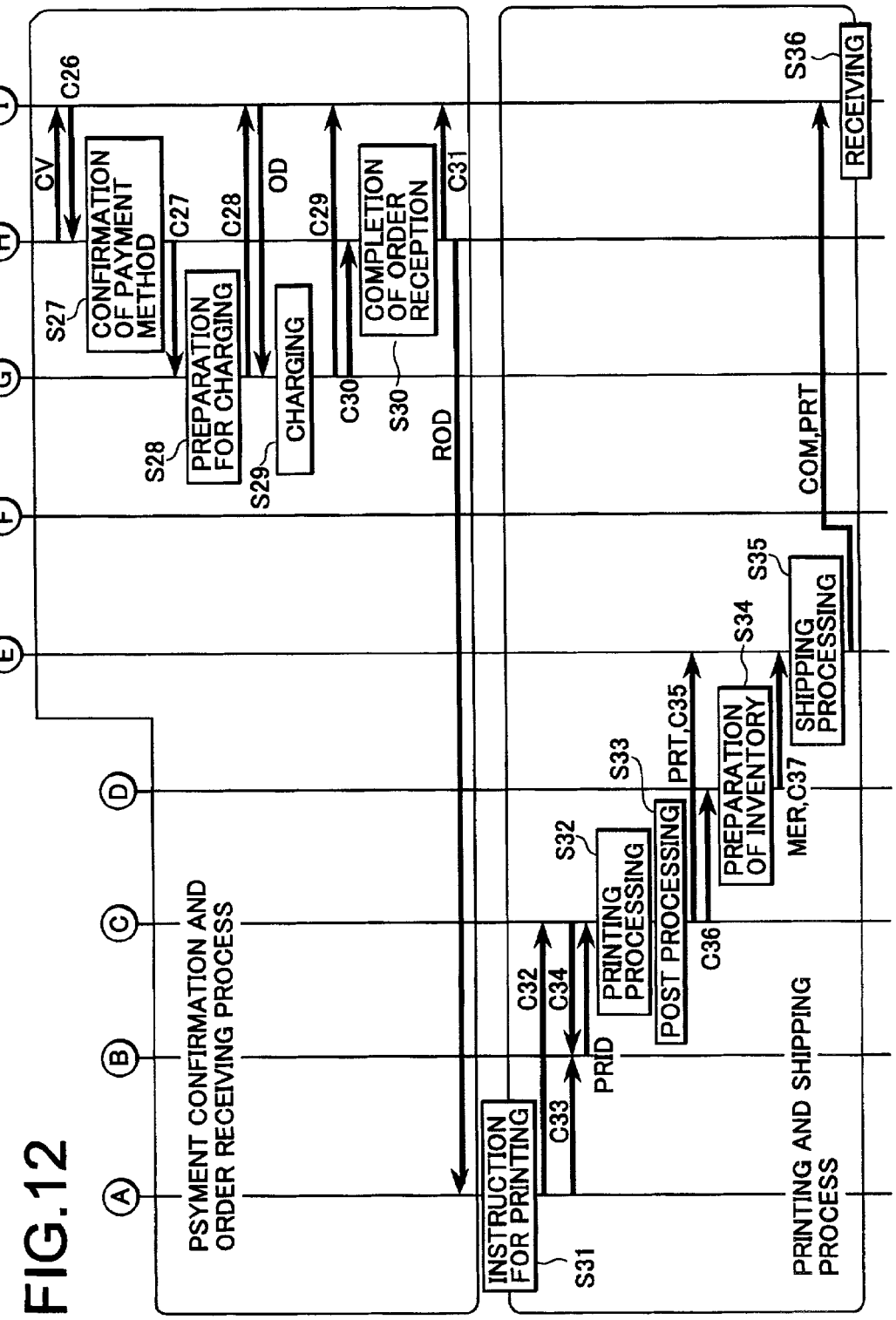
FIG. 12 is a diagram for illustrating a series of the processing processes in the merchandise order receiving system, illustrating payment confirmation & order receiving processes and printing & shipping process.

In more specific terms, the merchandise order receiving system receives an order of shipping of merchandise and a printed matter PRT by performing a series of processing as shown in FIG. 11 and FIG. 12. Incidentally, in FIG. 11 and FIG. 12, the contents of the processing of each apparatus in the merchandise order receiving system are shown, and the timing of the delivery of information between each apparatus is also shown. Moreover, the user terminal 90 in FIG. 11 and FIG. 12 may designate a user oneself being a customer.

The processes are roughly divided into four processes like the processes shown in FIG. 7 and FIG. 8. The four processes are connection & user inquiry process, reception and received contents confirmation processes, payment confirmation and order receiving processes, and printing and shipping process.

At first, in the merchandise order receiving system, as shown in FIG. 11, as the connection & user inquiry process, at step S21, the user terminal 90 performs the aforesaid access processing to the order controlling server 10. In the merchandise order receiving system, a connection request control signal C21 for request connection is supplied from the user terminal 90 to the order controlling server 10 in response to the access processing. Thereby, in the merchandise order receiving system, when the connection is permitted, the aforesaid predetermined initial screen IV for ordering is downloaded from the order controlling server 10 to the user terminal 90 to be displayed on the not shown display section of the user terminal 90.

Next, in the merchandise order receiving system, by the user's input of the predetermined information with an operation section, order data OD are generated. By the uploading of the generated order data OD to the order controlling server 10, the order data OD are supplied from the user terminal 90 to the order controlling server 10. Then, in the merchandise order receiving system, at step S22, the order controlling server 10 performs user inquiry, as the need arises.

Successively, in the merchandise order receiving system, when the eligibility of a user is certified and the user's order is permitted, as the reception and received contents confirmation processes, the aforesaid predetermined menu screen MV for ordering is downloaded from the order controlling server 10 to the user terminal 90 to be displayed on the display section of the user terminal 90. In the merchandise order receiving system, a user selects a desired merchandise to be ordered and image data, which are composed of desired character information and/or desired image information and are delivered together with the merchandise as a printed matter PRT of a hologram, in the menu displayed on the menu screen MV. And, by the operation of a selection button for the selection of the merchandise and the image data in the operation section, the order of the merchandise and the image data is performed. In the merchandise order receiving system, a selection control signal C22 indicating the selected merchandise and the selected image data is supplied from the user terminal 90 to the order controlling server 10 in response to the selection operation. Thereby, in the merchandise order receiving system, at step S23, reception contents such as the selected merchandise, the selected image data and an ordered quantity are confirmed by the order controlling server 10.

In succession, in the merchandise order receiving system, a preview display instruction control signal C23 for making the display section of the user terminal 90 displaying a preview image based on the selected image data is supplied from the order controlling server 10 to the image processing server 20. Thereby, in the merchandise order receiving system, at step S24, the image processing server 20 performs the predetermined preparation processing for performing the display of a preview image to the user terminal 90. Then, in the merchandise order receiving system, a data request control signal C24 indicating the request for the image data to be displayed as preview display is supplied from the image processing server 20 to the image storing server 30.

Consecutively, in the merchandise order receiving system, image data PVID are read from the image storing server 30 in response to the data request control signal C24 to be supplied to the image processing server 20. In the merchandise order receiving system, at step S25, the image processing server 20 performs the predetermined image processing of the image data PVID to supply the processed image data PVID to the user terminal 90 as a preview image PVI. The preview image PVI is displayed on the display section in the user terminal 90.

Then, in the merchandise order receiving system, when the user identifies the preview image PVI and performs a predetermined operation indicating the decision of the order of the merchandise and the printed matter PRT of the hologram having the same contents as the preview image PVI, the user terminal 90 supplies a confirmation control signal C25 indicating the confirmation of the preview image PVI and the order of the merchandise and the printed matter PVI to the order controlling server 10. In the merchandise order receiving system, at step S26, the order controlling server 10 verifies the final reception contents.

Next, in the merchandise order receiving system, as shown in FIG. 12, as the payment confirmation and order receiving processes, the aforesaid predetermined payment method screen CV is downloaded from the order controlling server 10 to the user terminal 90 to be displayed on the display section of the user terminal 90. In the merchandise order receiving system, a user selects a desired payment method in the menu displayed in the payment method screen CV and operates the selection button for the selection of the payment method with the operation section, and thereby the payment method control signal C26 is supplied from the user terminal 90 to the order controlling server 10. Then, in the merchandise order receiving system, at step S27, the order controlling server 10 verifies the payment method, and a charging instruction control signal C27 instructing charging is supplied to the charging & settlement server 40.

Consecutively, in the merchandise order receiving system, at step S28, the charging & settlement server 40 performs predetermined preparation processing for executing charging processing, and the charging & settlement server 40 supplies a payment information request signal C28 for request the aforesaid payment to the user terminal 90. With this, in the merchandise order receiving system, by the user's input of the predetermined payment information with the operation section of the user terminal 90, the payment information is generated as the aforesaid order data OD by the user terminal 90 to be supplied to the charging & settlement server 40. In the merchandise order receiving system, when the order data OD are supplied from the user terminal 90 to the charging & settlement server 40, at step S29, the charging & settlement server 40 executes the charging processing.

Then, in the merchandise order receiving system, a payment completion control signal C29 indicating the completion of the payment is supplied from the charging & settlement server 40 to the user terminal 90, and a charging completion control signal C30 indicating the completion of the charging processing is supplied from the charging & settlement server 40 to the order controlling server 10. In the merchandise order receiving system, at step S30, the order controlling server 10 performs the processing for completing the order reception to supply a reception completion control signal C31 indicating the completion of the reception from the order controlling server 10 to the user terminal 90, and further the aforesaid order receiving data ROD are supplied from the order controlling server 10 to the order receiving server 50.

In succession, in the merchandise order receiving system, as the printing and shipping process, at step S31, the order receiving server 50 generates a printing instruction control signal C32 for instructing the printing of an image to be supplied to the print out apparatus 60. Moreover, in the merchandise order receiving system, data request control signals C33 and C34 indicating the request of the image data to be printed are supplied from the order receiving server 50 and the print out apparatus 60 to the image storing server 30. With this, in the merchandise order receiving system, image data PRID to be printed are read from the image storing server 30 in response to the data request control signals C33 and C34 to be supplied to the print out apparatus 60.

Next, in the merchandise order receiving system, at step S32, the print out apparatus 60 performs the printing processing of the image data PRID, and further, at step S33, the post processing of the printing like the aforesaid step S13 is performed, as the need arises.

In succession, in the merchandise order receiving system, the print out apparatus 60 supplies a print ending control signal C35 indicating the ending of printing together with the printed matter PRT of a generated hologram to the shipping terminal 80. Moreover, the print out apparatus 60 supplies a print ending control signal C36 to the merchandise inventory apparatus 100. With this, in the merchandise order receiving system, at step S34, the merchandise inventory apparatus 100 prepares a merchandise to be shipped from inventory.

Then, in the merchandise order receiving system, a merchandise preparation completion control signal C37 indicating the completion of the preparation of the merchandise is supplied together with the prepared merchandise from the merchandise inventory apparatus 100 to the shipping terminal 80. With this, in the merchandise order receiving system, at step S35, the shipping terminal 80 performs predetermined shipping processing to forward the merchandise and the printed matter PRT together with each other to the user. The user, at step S36, receives the forwarded merchandise and the forwarded printed matter PRT, and the series of processing is terminated. Incidentally, the user incorporates the delivered printed matter PRT in the delivered merchandise, and thereby the aforesaid assembled merchandise MER is assembled.

As described above, in the merchandise order receiving system, a user can order and receive merchandise and a printed matter PRT of a hologram made by the exposure and the recording of a designated character and/or a designated image.

As described above, the merchandise order receiving system shown as the second embodiment of the present invention ships together merchandise and a printed matter PRT of a hologram, and thereby a user being a customer can order his or her exclusive merchandise and a printed matter PRT, both of which being unique, as like the merchandise order receiving system shown as the first embodiment. In particular, because the printed matter PRT is a hologram and then the printed matter PRT is difficult to copy, by the incorporation of the printed matter PRT in the merchandise, the assembled merchandise MER becomes difficult to imitate. Moreover, the assembled merchandise MER has a high possibility of being recovered in the case in which the assembled merchandise MER is lost or stolen, because the printed matter PRT, i.e. its proper information, is incorporated in the assembled merchandise MER. Moreover, by the merchandise order receiving system, a business operator can supply highly value added merchandise. By the performing of the order receiving of the merchandise through network, the processes from the order of the merchandise to the shipping of the merchandise can be simplified and the time required for the processes can be shortened.

Next, descriptions are given to a merchandise order receiving system as a third embodiment of the present invention, in which a merchandise and a printed matter including a hologram using a designated character and/or a designated image are shipped separately. The merchandise order receiving system has the configuration composed of the apparatuses basically same as those of the merchandise order receiving system shown as the second embodiment of the invention. The configuration of the third embodiment system differs from that of the second embodiment system in the aspect of delivering a merchandise and a printed matter separately. Accordingly, hereupon, each apparatus is designated by the same reference marks as those of the embodiment 1, and the detailed description thereof is omitted.

The merchandise order receiving system is, as shown in FIG. 9, equipped with the order controlling server 10, the image processing server 20, the image storing server 30, the charging & settlement server 40, the order receiving server 50, the print out apparatus 60, the shipping terminal 80, the user terminal 90 and the merchandise inventory apparatus 100.

The order controlling server 10, as mentioned above, includes the order computer 11 and the order database 12.

The various kinds of information concerning the reception of an order to be stored in the order database 12 are composed of, as shown in FIG. 13, the elements of "Order Number", "Password", "Order Date", "Ordered Merchandise", "Classification of Merchandise", "Quantity", "Ordered Price", "Charging Number", "Addressee's Name", "Addressee's Address", "Character & Image Data" and "Processed Image Data", all being shown in FIG. 2 in the above. Besides, the information includes "Merchandise Shipping Date" indicating the dispatch or shipping date each merchandise and "Printed matter Shipping Date" indicating the shipping date of each printed matter including a hologram in place of "Shipping Date".

This order controlling server 10 receives the orders for a merchandise and a printed matter, and generates the information concerning the reception of the orders.

The order receiving server 50, as mentioned above, includes an order receiving computer 51 and an order receiving database 52.

The order receiving computer 51, as mentioned above, generates various kinds of information concerning order receiving based on the aforesaid order data supplied from the order controlling server 10 to supply the information to the order receiving database 52. Moreover, the order receiving computer 51 generates an inventory preparation instruction control signal instructing the preparation of merchandise in stock to be shipped to supply the inventory preparation instruction control signal to the merchandise inventory apparatus 100. Moreover, the order receiving computer 51 generates a printing instruction control signal instructing the printing of an image. The order receiving computer 51 supplies the printing instruction control signal to the print out apparatus 60, and further the order receiving computer 51 supplies a data request control signal indicating the request of image data to be printed to the image storing server 30.

The order receiving database 52, as described above, stores various kinds of information that concern order receiving and are generated by the order receiving computer 51 as a database. The various kinds of information are read from the order receiving database 52 by the order receiving computer 51 as the need arises.

This order receiving server 50 performs the whole processing concerning the order receiving of the shipping of each merchandise, and generates the information concerning each order receiving indicating the contents of the order receiving.

The print out apparatus 60, as mentioned above, includes the output computer 61 and the printer 62.

As mentioned above, when a printing instruction control signal instructing the printing of an image is supplied to the output computer 61 from the order receiving server 50, the output computer 61 supplies a data request control signal indicating the request of character information and/or image information to be printed as a hologram to the image storing server 30, and the output computer 61 makes the printer 62 print the character information and/or the image information, both being read in response to the data request control signal, as a hologram. When the printing ends, the output computer 61 supplies a print ending control signal indicating the ending of printing together with the generated printed matter of the hologram to the shipping terminal 80.

The printer 62, as mentioned above, prints character information and/or image information as a hologram under the control of the output computer 61 to print out the hologram or the like. The hologram is supplied to the shipping terminal 80 by the output computer 61.

This print out apparatus 60 prints the designated character information and/or the designated image information, and generates a printed matter including the hologram.

As mentioned above, the shipping terminal 80 includes the shipping computer 81.

As described above, when a print ending control signal indicating the completion of printing is supplied to the shipping computer 81 from the print out apparatus 60, the shipping computer 81 performs various kinds of processing for the preparation for shipping a printed matter. Furthermore, when a merchandise preparation completion control signal indicating the completion of the preparation for a merchandise to be forwarded is supplied to the shipping computer 81 from the merchandise inventory apparatus 100, the shipping computer 81 performs various kinds of processing for the preparation for shipping the merchandise. The merchandise and the printed matter are separately forwarded when the preparation for shipping by the shipping computer 81 is completed. The shipping computer 81 generates shipping information indicating the shipping of the merchandise and the printed matter, and records the information in, for example, a hard disk drive or the like, or displays the information on a display section. At this date, the shipping computer 81, as mentioned above, accesses to the order receiving server 50 as the need arises, and reads various kinds of information concerning order receiving stored in the order receiving database 52 with the order receiving computer 51. This shipping terminal 80 performs various kinds of processing necessary for shipping separately the merchandise and the printed matter to a user being a right addressee.

The merchandise inventory apparatus 100, as described above, includes the inventory computer 101 and the warehouse 102.

When a inventory preparation instruction control signal indicating the preparation for a merchandise to be forwarded in the inventory is supplied to the inventory computer 101 from the order receiving server 50, as described above, the inventory computer 101 performs processing such as the investigation of the existence of the merchandise to be forwarded in the inventory under its control. When the preparation for the merchandise to be forwarded is completed, the inventory computer 101 supplies a merchandise preparation completion control signal indicating the completion of the preparation for the merchandise together with the merchandise to the shipping terminal 80.

As mentioned above, the warehouse 102 is managed under the control of the inventory computer 101 to prepare a designated product or merchandise.

This merchandise inventory apparatus 100 prepares merchandise as a final shipping product or good in order to supply the merchandise to the shipping terminal 80.

Now, the merchandise order receiving system composed of each apparatus like this performs the delivery of information between each apparatus as shown in FIG. 14, and receives an order for the shipping of a merchandise and a printed matter.

In the merchandise order receiving system, at first, a user accesses to the order controlling server 10 with the user terminal 90, and order data OD are transmitted to the order controlling server 10. In the merchandise order receiving system, when a merchandise and a printed matter PRT are ordered in such way, the image processing server 20 reads the designated character information and/or the designated image information from the image storing server 30 as image data, and the predetermined image processing is performed to the read image data. The image data obtained as a result of the processing are downloaded to the user terminal 90 as a preview image, and are displayed on the display section of the user terminal 90. In the merchandise order receiving system, when a user identifies a preview image, the payment information as the aforesaid order data OD is delivered between the user terminal 90 and the charging & settlement server 40, and thereby the charging processing is performed. In the merchandise order receiving system, the order controlling server 10 generates the aforesaid order receiving data ROD corresponding to the charging processing. By the supply of the order receiving data ROD to the order receiving server 50, the order of the merchandise and the printed matter PRT are received. Then, in the merchandise order receiving system, the merchandise inventory inventory apparatus 100 prepares a merchandise in response to a inventory preparation instruction from the order receiving server 50. Besides, the image storing server 30 and the print out apparatus 60 operate to generate a printed matter PRT of a hologram in response to a print instruction from the order receiving server 50. The merchandise and the printed matter PRT are separately forwarded to the user through the shipping terminal 80.

In the merchandise order receiving system, the delivery of information is performed in such a way, and then the merchandise and the printed matter PRT reach the user.

Figure 15:
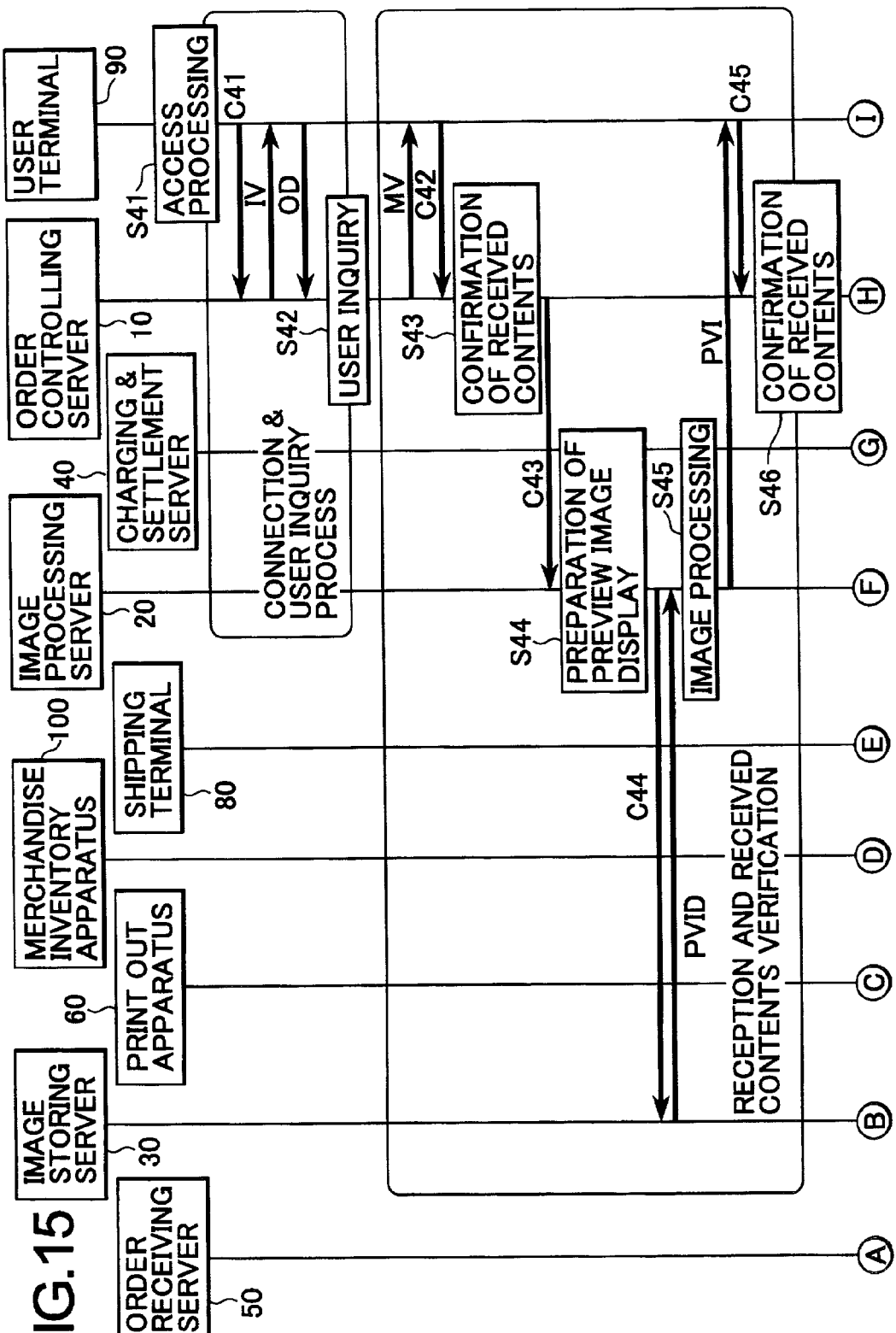
FIG. 15 is a diagram for illustrating a series of processing processes in the merchandise order receiving system, illustrating connection & user inquiry process and reception & received contents confirmation processes.

In more specific terms, the merchandise order receiving system receives an order of shipping of merchandise and a printed matter PRT by performing a series of processing as shown in FIG. 15 and FIG. 16. In FIG. 15 and FIG. 16, the contents of the processing of each apparatus in the merchandise order receiving system are shown, and the timing of the delivery of information between each apparatus is also shown. Moreover, the user terminal 90 in FIG. 15 and FIG. 16 may designate a user oneself being a customer.

The processes are roughly divided into four processes like the processes shown in FIG. 7 and FIG. 8. The four processes are connection & user inquiry process, reception and received contents confirmation processes, payment confirmation and order receiving process, and printing and shipping process.

At first, in the merchandise order receiving system, as shown in FIG. 15, as the connection & user inquiry process, at step S41, the user terminal 90 performs the aforesaid access processing to the order controlling server 10. In the merchandise order receiving system, a connection request control signal C41 for requesting connection is supplied from the user terminal 90 to the order controlling server 10 in response to the access processing. Thereby, in the merchandise order receiving system, when the connection is permitted, the aforesaid predetermined initial screen IV for ordering is downloaded from the order controlling server 10 to the user terminal 90 to be displayed on the not shown display section of the user terminal 90.

Next, in the merchandise order receiving system, by the user's input of the predetermined information with an operation section, order data OD is generated. By the uploading of the generated order data OD to the order controlling server 10, the order data OD are supplied from the user terminal 90 to the order controlling server 10. Then, in the merchandise order receiving system, at step S42, the order controlling server 10 performs user inquiry as the need arises.

Successively, in the merchandise order receiving system, when the eligibility of a user is certified and the user's order is permitted, as the reception and received contents confirmation processes, the aforesaid predetermined menu screen MV for ordering is downloaded from the order controlling server 10 to the user terminal 90 to be displayed on the display section of the user terminal 90. In the merchandise order receiving system, a user selects a desired merchandise to be ordered and image data, which are composed of desired character information and/or desired image information and are separately delivered from the merchandise as a printed matter PRT of a hologram, in the menu displayed on the menu screen MV. And, by the operation of a selection button for the selection of the merchandise and the image data in the operation section, the order of the merchandise and the image data is performed. In the merchandise order receiving system, a selection control signal C42 indicating the selected merchandise and the selected image data is supplied from the user terminal 90 to the order controlling server 10 in response to the selection operation. Thereby, in the merchandise order receiving system, at step S43, reception contents such as the selected merchandise, the selected image data and an ordered quantity are confirmed by the order controlling server 10.

In sequence, in the merchandise order receiving system, a preview display instruction control signal C43 for making the display section of the user terminal 90 displaying a preview image based on the selected image data is supplied from the order controlling server 10 to the image processing server 20. Thereby, in the merchandise order receiving system, at step S44, the image processing server 20 performs the predetermined preparation processing for performing the display of a preview image to the user terminal 90. Then, in the merchandise order receiving system, a data request control signal C44 indicating the request for the image data to be displayed as a preview display is supplied from the image processing server 20 to the image storing server 30.

Consecutively, in the merchandise order receiving system, image data PVID are read from the image storing server 30 in response to the data request control signal C44 to be supplied to the image processing server 20. In the merchandise order receiving system, at step S45, the image processing server 20 performs the predetermined image processing of the image data PVID to supply the processed image data PVID to the user terminal 90 as a preview image PVI. The preview image PVI is displayed on the display section in the user terminal 90.

Then, in the merchandise order receiving system, when the user identifies the preview image PVI and performs a predetermined operation indicating the decision of the order of the merchandise and the printed matter PRT of the hologram having the same contents as the preview image PVI, the user terminal 90 supplies a confirmation control signal C45 indicating the confirmation of the preview image PVI and the order of the merchandise and the printed matter PVI to the order controlling server 10. In the merchandise order receiving system, at step S46, the order controlling server 10 verifies the final reception contents.

Next, in the merchandise order receiving system, as shown in FIG. 16, as the payment confirmation and order receiving processes, the aforesaid predetermined payment method screen CV is downloaded from the order controlling server 10 to the user terminal 90 to be displayed on the display section of the user terminal 90. In the merchandise order receiving system, a user selects a desired payment method in the menu displayed in the payment method screen CV and operates the selection button for the selection of the payment method with the operation section, and thereby the payment method control signal C46 is supplied from the user terminal 90 to the order controlling server 10. Then, in the merchandise order receiving system, at step S47, the order controlling server 10 verifies the payment method, and a charging instruction control signal C47 instructing charging is supplied to the charging & settlement server 40.

Consecutively, in the merchandise order receiving system, at step S48, the charging & settlement server 40 performs predetermined preparation processing for executing charging processing, and the charging & settlement server 40 supplies a payment information request signal C48 for requesting the aforesaid payment to the user terminal 90. With this, in the merchandise order receiving system, by the user's input of the predetermined payment information with the operation section of the user terminal 90, the payment information is generated as the aforesaid order data OD by the user terminal 90 to be supplied to the charging & settlement server 40. In the merchandise order receiving system, when the order data OD are supplied from the user terminal 90 to the charging & settlement server 40, at step S49, the charging & settlement server 40 executes the charging processing.

Then, in the merchandise order receiving system, a payment completion control signal C49 indicating the completion of the payment is supplied from the charging & settlement server 40 to the user terminal 90, and a charging completion control signal C50 indicating the completion of the charging processing is supplied from the charging & settlement server 40 to the order controlling server 10. In the merchandise order receiving system, at step S50, the order controlling server 10 performs the processing for completing the order reception to supply a reception completion control signal C51 indicating the completion of the reception from the order controlling server 10 to the user terminal 90, and further the aforesaid order receiving data ROD are supplied from the order controlling server 10 to the order receiving server 50.

In succession, in the merchandise order receiving system, as the printing and shipping process, at step S51, the order receiving server 50 generates a inventory preparation instruction control signal C52 for instructing the preparation for a merchandise to be forwarded in the inventory to supply the generated inventory preparation instruction control signal C52 to the merchandise inventory apparatus 100. With this, in the merchandise order receiving system, at step S52, the merchandise inventory apparatus 100 prepares the merchandise to be forwarded in the inventory. In the merchandise order receiving system, merchandise inventory apparatus 100 supplies the prepared merchandise together with a merchandise preparation completion control signal C53 indicating the completion of the preparation for the merchandise to the shipping terminal 80.

On the other hand, in the merchandise order receiving system, at step S53, substantially in parallel with the processes at step S51 and step S52, the order receiving server 50 generates a printing instruction control signal C54 for instructing the printing of an image to be supplied to the print out apparatus 60. Moreover, in the merchandise order receiving system, data request control signals C55 and C56 indicating the request of the image data to be printed are supplied from the order receiving server 50 and the print out apparatus 60 to the image storing server 30. With this, in the merchandise order receiving system, image data PRID to be printed are read from the image storing server 30 in response to the data request control signals C55 and C56 to be supplied to the print out apparatus 60.

In succession, in the merchandise order receiving system, at step S54, the print out apparatus 60 performs the printing processing of the image data PRID, and further, at step S55, the post processing of the printing like the aforesaid step S13 is performed as the need arises. Then, in the merchandise order receiving system, the print out apparatus 60 supplies a print ending control signal C57 indicating the ending of printing together with the printed matter PRT of a generated hologram to the shipping terminal 80.

Moreover, in the merchandise order receiving system, at step S56, the shipping terminal 80 performs predetermined shipping processing to the merchandise, and the merchandise is forwarded to the user. The user, at step S57, receives the forwarded merchandise. Moreover, in the merchandise order receiving system, at step S58, the shipping terminal 80 performs the predetermined shipping processing of a printed matter PRT to forward the printed matter PRT to the user. The user, at step S59, receives the forwarded printed matter PRT, and the series of processing is terminated. Incidentally, the user incorporates the delivered printed matter PRT in the delivered merchandise, and thereby the aforesaid assembled merchandise MER is assembled.

As described above, in the merchandise order receiving system, a user can order and receive the merchandise, and the printed matter PRT of a hologram made by the exposure and the recording of a designated character and/or a designated image.

The merchandise order receiving system shown as the third embodiment of the present invention can be applied to a case where a user orders another printed matter later such as a case where the user orders a certain merchandise and a printed matter PRT to be forwarded separately from each other and the user uses the merchandise in a status such that another printed matter is incorporated in the merchandise later. In such a case, in the merchandise order receiving system, by the use of the various kinds of information concerning the reception of an order to be stored in the order database 12 shown in FIG. 13 in the above, or by the use of the information derived from the information, the order receiving of a printed matter can simply be performed.

As described above, the merchandise order receiving system shown as the third embodiment of the present invention delivers a merchandise and a printed matter PRT of a hologram separately from each other, and thereby a user being a customer can order his or her own merchandise and a printed matter PRT, both of which does not exist in any other place, like the merchandise order receiving system shown as the second embodiment. In particular, because the printed matter PRT is a hologram and then the printed matter PRT is difficult to copy, by the incorporation of the printed matter PRT in the merchandise, the assembled merchandise MER becomes difficult to imitate. Moreover, the assembled merchandise MER has a high possibility of being recovered in the case where the assembled merchandise MER is lost or stolen, because the printed matter PRT, i.e. its exclusive information, is incorporated in the assembled merchandise MER. Moreover, by the merchandise order receiving system, a business operator can supply highly value added merchandise. By the performing the order receiving of merchandise through network, the processes from the order of the merchandise to the shipping of the merchandise can be simplified and the time for the processing can be shortened.

As described above, in the systems for receiving order for merchandise shown as the embodiments of the present invention, a customer designates a desired character and/or a desired image like the designation of the classification and the like of merchandise when the customer orders the merchandise. Then, the systems deliver the merchandise, in which a printed matter including a hologram using the designated character and/or the designated image is incorporated in the merchandise. Or, the systems deliver the merchandise and the printed matter of the hologram using the designated character and/or the designated image together with each other or separately from each other. The user being a customer can order his or her exclusive merchandise that can be identified by a printed matter of a personalized hologram that is difficult to copy. Consequently, the systems can provide high convenience and amusement. In particular, in the systems, because the printed matter is a hologram difficult to copy and to imitate, the user can purchase merchandise that the user designates by himself and is difficult to imitate. That is, the user can purchase highly value added merchandise. Thus, the systems can supply merchandise having a high possibility of recovery in case of being lost or stolen.

Furthermore, a business operator can supply highly value added merchandise for each customer through the merchandise order receiving system of the present invention. Moreover, the processes from the order of merchandise to the shipping of the merchandise can be simplified and the time for processing can be shortened. Consequently, the systems provide a convenience such that the management of customers becomes easy. In particular, the systems can further make merchandise difficult to imitate by their own trademarks and their own numbers that are ordinarily attached to merchandise such as the names of the merchandise, trademarks indicating the names of manufacturers, logos and manufacturer's serial numbers, and/or by designs including trademarks as the contents of hologram that are recorded in the holograms, and/or by designs other than the contents of the holograms such as shape, the fixing position and a way of fixing the holograms to the merchandise.

In addition, the present invention is not limited to the aforesaid embodiments, but the invention may be implemented as, for example, a combination of the aforesaid three embodiments. That is, although the aforesaid three embodiments are severally described as a separate system, the merchandise order receiving system may take a form such that a user can select one of a mode of being incorporated, a mode of delivered together and a mode of delivered separately at the date of ordering and the delivery of information is performed with a merchandise assembling apparatus or a merchandise inventory apparatus according to one's preference.

Furthermore, as mentioned above, although the aforesaid embodiments output a printed matter PRT of a hologram with a print out apparatus 60, the printed matter PRT of a hologram is preferable to be a holographic stereogram made by exposure and the recording of two-dimensional image strings as a hologram. As a technique for making the holographic stereogram, there can be cited a system for making a printed matter that makes it possible to express only lateral direction parallax and is disclosed in, for example:

Akira Shirakura, Nobuhiro Kihara and Shigeyuki Baba, "Instant Holographic Portrait Printing System", Proceeding of SPIE, Vol. 3293, pp. 246-253, January 1998; and Kihara, Shirokura, Baba, "High Speed Hologram Portrait Print System", Three-dimensional Image Conference 1998, July, 1998, and also there can be cited a system for making a printed matter that makes it possible to express both of lateral direction parallaxes and longitudinal direction parallaxes and is disclosed in, for example:

Yamaguchi, Honda, Oyama, "Holographic Three-Dimensional Printer Using Lippman's Holographic Stereogram", The Twentieth Image Engineering Conference, December, 1989; and Endo, Yamaguchi, Honda, Oyama, "High Density Recording Using Holographic Three-Dimensional Printer", Twenty-Third Image Engineering Conference, December, 1992.

As the print out apparatus 60, the technique for making a holographic stereogram that is possible to express one-directional parallax or lateral and longitudinal directional parallax like the techniques disclosed above can be used.

Furthermore, as a printed matter PRT of a hologram output from the print out apparatus 60, it may be the so-called computer hologram such that phases of light are computed based on object data such as three-dimensional shapes and colors and the phase information thereof is exposed and recorded.

Furthermore, in the aforesaid embodiments, descriptions are made such that the processing for converting the character information and/or the image information, both being stored in the image storing server 30, to the information having a form suitable for preview display is performed with the image processing server 20. More specifically, the processing is to perform the conversion processing of an image in a form suitable for making a hologram, namely a parallax image group including information at every angular direction, to the original thereof.

Hereupon, in the processing for converting an image in a form suitable for making a hologram to an image in a form suitable for preview display, it is desirable to convert and to extract an image in case of being observed from a plurality of angular directions among a parallax image group including information at every angular direction. In particular, in the case where images in a form suitable for making a hologram is in an image string composed of a plurality of images observed at every angular direction, it is preferable to extract a plurality of images extracted at predetermined intervals such as a uniform interval, both ends or the vicinity of the center among the image string as the images in a form suitable for preview displaying.

Although the invention has been described in its preferred form with a certain degree of particularity, obviously many other changes, variations and combinations are possible therein. It is therefore to be understood that any modifications will be practiced otherwise than as specifically described herein without departing from the scope of the present invention.

What is claimed is:

1. A merchandise order receiving system, comprising:
a plurality of communication terminals for a user to order merchandise and to select image data for customizing the merchandise through a first network, wherein the merchandise is customized by incorporating a hologram of the selected image data;
an order controlling apparatus connected with said plurality of communication terminals through the first network for receiving an order of the merchandise from said plurality of communication terminals;
an image storing apparatus connected with said order controlling apparatus through a second network different from the first network, said image storing apparatus storing character information and/or image information as image data;
a charging and settlement apparatus connected with said plurality of communication terminals through the first network for performing charging and settlement of the ordered merchandise;
an order receiving apparatus connected with said order controlling apparatus through the second network for receiving an order of shipping of the merchandise through the second network, the shipping being ordered to said order controlling apparatus by said plurality of communication terminals through the first network, according to the charging and settlement performed by said charging and settlement apparatus;
a print out apparatus connected with said order controlling apparatus through the second network for printing the hologram of the selected image data supplied from said image storing apparatus through the second network as printed matter;
a merchandise assembling apparatus connected with said order controlling apparatus through the second network, for incorporating the printed matter in the merchandise to assemble an assembled merchandise as final shipping goods, thereby customizing the merchandise with the hologram of the selected image data; and
a shipping terminal connected with said order controlling apparatus through the second network, for performing shipping processing of the assembled merchandise assembled by said merchandise assembling apparatus, wherein:
the merchandise order receiving system further comprising an image processing apparatus for processing the selected image data supplied from said image storing apparatus to generate a preview image of the merchandise incorporating the hologram of the selected image data for preview display to the user.

2. The merchandise order receiving system according to claim 1, wherein said plurality of communication terminals generate order data indicating contents of orders and supply the order data to said order controlling apparatus through the first network.

3. The merchandise order receiving system according to claim 2, wherein said order controlling apparatus generates information concerning reception of an order indicating contents of the order, based on the order data supplied from said plurality of communication terminals through the first network, and said order controlling apparatus stores the information of the reception of the order generated correspondingly to a plurality of orders.

4. The merchandise order receiving system according to claim 2, wherein said plurality of communication terminals generate payment information, the payment information being information concerning a payment method for disbursing of a charge as the order data to supply the order data to said charging and settlement apparatus through the first network.

5. The merchandise order receiving system according to claim 4, wherein said charging and settlement apparatus performs the charging and the settlement of the ordered merchandise based on the order data supplied from said plurality of communication terminals through the first network.

6. The merchandise order receiving system according to claim 5, wherein said charging and settlement apparatus generates information concerning charging and settlement, the information indicating contents of charging processing, based on the order data supplied from said plurality of communication terminals through the first network, and said charging and settlement apparatus stores the information concerning the charging and the settlement, generated correspondingly to a plurality of charging processing, as a database.

7. The merchandise order receiving system according to claim 5, wherein said order controlling apparatus generates order receiving data indicating contents of an order to supply the order receiving data to said order receiving apparatus through the second network when said charging and settlement apparatus completes charging processing.

8. The merchandise order receiving system according to claim 7, wherein said order receiving apparatus generates information concerning order receiving and indicating contents of the order receiving based on the order receiving data supplied from said order controlling apparatus through the second network, and said order receiving apparatus stores the information concerning the order receiving generated correspondingly to a plurality of order receiving as a database.

9. The merchandise order receiving system according to claim 1, wherein said image storing apparatus generates information concerning the image data corresponding to the stored image data, the information indicating contents of the image data, and said image storing apparatus stores the information that concerns the image data and is generated correspondingly to a plurality of image data as a database.

10. The merchandise order receiving system according to claim 1, wherein said plurality of communication terminals display the preview image supplied from said image processing apparatus through the first network on a display section, and said plurality of communication terminals generate payment information concerning a payment method necessary for payment of a charge as a part of the order data in response to a result of displaying the preview image to supply the order data to said charging and settlement apparatus through the first network.

* * * * *